United States Patent
Ogawa et al.

(10) Patent No.: US 9,367,469 B2
(45) Date of Patent: Jun. 14, 2016

(54) STORAGE SYSTEM AND CACHE CONTROL METHOD

(71) Applicant: Hitachi, Ltd., Tokyo (JP)

(72) Inventors: Junji Ogawa, Sagamihara (JP); Akifumi Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 623 days.

(21) Appl. No.: 13/816,656

(22) PCT Filed: Jan. 31, 2013

(86) PCT No.: PCT/JP2013/000540
§ 371 (c)(1),
(2) Date: Feb. 12, 2013

(87) PCT Pub. No.: WO2014/118822
PCT Pub. Date: Aug. 7, 2014

(65) Prior Publication Data
US 2015/0324294 A1    Nov. 12, 2015

(51) Int. Cl.
*G06F 12/08* (2006.01)
*G06F 11/10* (2006.01)

(52) U.S. Cl.
CPC ........ *G06F 12/0871* (2013.01); *G06F 11/1076* (2013.01); *G06F 2211/1009* (2013.01); *G06F 2211/1059* (2013.01); *G06F 2212/7202* (2013.01); *G06F 2212/7211* (2013.01)

(58) Field of Classification Search
CPC ....................... G06F 12/0871; G06F 2212/7202
See application file for complete search history.

(56) References Cited

U.S. PATENT DOCUMENTS

| | | | | |
|---|---|---|---|---|
| 5,297,258 A * | 3/1994 | Hale | ...... | G06F 3/0601 711/113 |
| 5,485,571 A * | 1/1996 | Menon | ...... | G06F 11/1076 714/6.32 |
| 5,504,858 A * | 4/1996 | Ellis | ...... | G06F 11/1076 714/52 |
| 5,542,066 A * | 7/1996 | Mattson | ...... | G06F 12/0804 711/113 |
| 5,583,876 A * | 12/1996 | Kakuta | ...... | G06F 11/1076 711/114 |
| 5,657,468 A * | 8/1997 | Stallmo | ...... | G06F 3/0601 711/114 |
| 5,859,965 A * | 1/1999 | Gittins | ...... | G06F 11/1076 711/114 |
| 6,298,415 B1 * | 10/2001 | Riedle | ...... | G06F 11/1076 711/111 |
| 7,555,620 B1 * | 6/2009 | Manley | ...... | G06F 11/1464 707/999.202 |

(Continued)

FOREIGN PATENT DOCUMENTS

WO    WO 2012/137242 A1    10/2012

*Primary Examiner* — Jared Rutz
*Assistant Examiner* — Khoa D Doan
(74) *Attorney, Agent, or Firm* — Foley & Lardner LLP

(57) ABSTRACT

A cache memory comprises a cache controller and a nonvolatile semiconductor memory as a storage medium. The nonvolatile semiconductor memory comprises multiple blocks, which are data erase units, and each block comprises multiple pages, which are data write and read units. The cache controller receives data and attribute information of the data, and, based on the received attribute information and attribute information of the data stored in the multiple blocks, selects a storage-destination block for storing the received data, and writes the received data to a page inside the selected storage-destination block.

11 Claims, 25 Drawing Sheets

(56) References Cited

U.S. PATENT DOCUMENTS

| | | | |
|---|---|---|---|
| 8,549,222 B1* | 10/2013 | Kleiman | G06F 3/0613 711/103 |
| 8,560,772 B1* | 10/2013 | Piszczek | G06F 11/1076 711/114 |
| 8,984,374 B2* | 3/2015 | Yoshihara | G06F 11/1412 714/52 |
| 9,262,265 B2* | 2/2016 | Yoshihara | G06F 11/1412 |
| 2001/0008008 A1* | 7/2001 | Mori | G06F 11/2089 711/114 |
| 2005/0132212 A1* | 6/2005 | Haswell | G06F 3/0619 713/193 |
| 2005/0283648 A1* | 12/2005 | Ashmore | G06F 1/3203 714/5.11 |
| 2006/0206752 A1* | 9/2006 | Ikeuchi | G06F 11/1076 714/6.22 |
| 2006/0212644 A1* | 9/2006 | Acton | G06F 1/30 711/103 |
| 2008/0082589 A1* | 4/2008 | English | G06F 17/30076 |
| 2008/0270690 A1* | 10/2008 | English | G06F 3/0613 711/114 |
| 2009/0157989 A1* | 6/2009 | Karamcheti | G06F 12/0246 711/156 |
| 2010/0100664 A1* | 4/2010 | Shimozono | G06F 3/0611 711/103 |
| 2010/0235569 A1* | 9/2010 | Nishimoto | G06F 12/08 711/103 |
| 2011/0010488 A1* | 1/2011 | Aszmann | G06F 3/0608 711/103 |
| 2011/0066788 A1* | 3/2011 | Eleftheriou | G11C 16/349 711/103 |
| 2011/0066882 A1* | 3/2011 | Walls | G06F 11/1068 714/6.24 |
| 2011/0107042 A1* | 5/2011 | Herron | G06F 3/0605 711/161 |
| 2011/0197024 A1* | 8/2011 | Thomas | G06F 11/2094 711/114 |
| 2011/0208995 A1* | 8/2011 | Hafner | G06F 11/1076 714/6.24 |
| 2011/0320687 A1* | 12/2011 | Belluomini | G06F 12/0804 711/103 |
| 2012/0011314 A1* | 1/2012 | Yochai | G06F 1/3268 711/113 |
| 2012/0054421 A1* | 3/2012 | Hiratsuka | G06F 12/0246 711/103 |
| 2012/0254513 A1* | 10/2012 | Uehara | G06F 3/0616 711/103 |
| 2013/0007572 A1* | 1/2013 | Kotzur | H03M 13/11 714/800 |
| 2013/0024599 A1* | 1/2013 | Huang | G06F 3/0611 711/102 |
| 2013/0145078 A1* | 6/2013 | Cheng | G06F 12/0246 711/103 |
| 2013/0205114 A1* | 8/2013 | Badam | G06F 3/0613 711/207 |
| 2013/0290777 A1* | 10/2013 | Yoshihara | G06F 11/1412 714/15 |
| 2013/0339569 A1* | 12/2013 | Yochai | G06F 12/0868 711/102 |
| 2013/0339574 A1* | 12/2013 | Franceschini | G06F 12/0246 711/103 |
| 2014/0122811 A1* | 5/2014 | Shwartsman | G06F 12/0831 711/144 |
| 2014/0122824 A1* | 5/2014 | Lewsey | G06F 12/02 711/170 |

\* cited by examiner

Fig. 13

| Block number | In-block Page number | Page attribute | Logical address | |
|---|---|---|---|---|
| 10 | 0 | Invalid | None | 522a |
| | 1 | Invalid | None | 522b |
| | 2 | Invalid | None | 522c |
| | 3 | Invalid | None | 522d |
| 22 | 0 | Valid | 100 | 522e |
| | 1 | Valid | 102 | 522f |
| | 2 | Valid | 101 | 522g |
| | 3 | Free | None | 522h |

Page information (501 Block number, 502 In-block Page number, 503 Page attribute, 504 Logical address) — 316c

Fig. 14

| Block number (501) | In-block Page number (502) | Page attribute (503) | Logical address (504) | |
|---|---|---|---|---|
| 10 | 0 | Free | None | ~523a |
| | 1 | Free | None | ~523b |
| | 2 | Free | None | ~523c |
| | 3 | Free | None | ~523d |
| ⋮ | | | | |
| 22 | 0 | Valid | 100 | ~523e |
| | 1 | Valid | 102 | ~523f |
| | 2 | Valid | 101 | ~523g |
| | 3 | Free | None | ~523h |
| ⋮ | | | | |

Page information — 316d

Fig. 19

| Block number | In-block Page number | Page attribute | Logical address | |
|---|---|---|---|---|
| 10 | 0 | Valid | 100 | ~524a |
| | 1 | Valid | 200 | ~524b |
| | 2 | Valid | 201 | ~524c |
| | 3 | Valid | 300 | ~524d |
| | 4 | Valid | 110 | ~524e |
| | 5 | Valid | 210 | ~524f |
| | 6 | Valid | 211 | ~524g |
| | 7 | Valid | 310 | ~524h |

(501, 502, 503, 504 — Page information — 316e)

Fig. 20

| | | Page information | | |
|---|---|---|---|---|
| 501 | 502 | 503 | 504 | |
| Block number | In-block Page number | Page attribute | Logical address | |
| 10 | 0 | Valid | 100 | ~525a |
| | 1 | Invalid | 200 | ~525b |
| | 2 | Invalid | 201 | ~525c |
| | 3 | Valid | 300 | ~525d |
| | 4 | Valid | 110 | ~525e |
| | 5 | Invalid | 210 | ~525f |
| | 6 | Invalid | 211 | ~525g |
| | 7 | Valid | 310 | ~525h |

Page information (316g)

| Block number (501) | In-block Page number (502) | Page attribute (503) | Logical address (504) | Block attribute (505) |
|---|---|---|---|---|
| 10 | 0 | Valid | 100 | Master New data Dirty |
|  | 1 | Valid | 300 | |
|  | 2 | Valid | 110 | |
|  | 3 | Valid | 310 | |
| ⋮ | | | | |
| 22 | 0 | Valid | 200 | Master Old data Clean |
|  | 1 | Valid | 201 | |
|  | 2 | Valid | 210 | |
|  | 3 | Valid | 211 | |
| ⋮ | | | | |

Page information

| Block number | In-block Page number | Page attribute | Logical address | Block attribute |
|---|---|---|---|---|
| 501 | 502 | 503 | 504 | 505 |
| 10 | 0 | Valid | 100 | Master New data Dirty |
| | 1 | Valid | 300 | |
| | 2 | Valid | 110 | |
| | 3 | Valid | 310 | |
| ⋮ | | | | |
| 22 | 0 | Invalid | 200 | Master Old data Clean |
| | 1 | Invalid | 201 | |
| | 2 | Invalid | 210 | |
| | 3 | Invalid | 211 | |
| ⋮ | | | | |

Fig. 23

| Block number | In-block Page number | Page attribute | Logical address | Block attribute | Page attribute details |
|---|---|---|---|---|---|
| 10 | 0 | Valid | 100 | Master New data Dirty | Cleaned |
| | 1 | Valid | 300 | | No change |
| | 2 | Valid | 110 | | No change |
| | 3 | Valid | 310 | | No change |
| ⋮ | | | | | |
| 22 | 0 | Valid | 200 | Master Old data Clean | No change |
| | 1 | Valid | 201 | | No change |
| | 2 | Valid | 210 | | No change |
| | 3 | Valid | 211 | | No change |
| ⋮ | | | | | |

Page information — 316i
501 Block number, 502 In-block Page number, 503 Page attribute, 504 Logical address, 505 Block attribute, 506 Page attribute details

STORAGE SYSTEM AND CACHE CONTROL METHOD

TECHNICAL FIELD

The present invention relates to technology for a storage system and a cache control method.

BACKGROUND ART

A storage system manages and controls multiple storage devices configured using RAID (Redundant Array of Independent Disks). A storage system like this can provide a host computer with a storage area of the multiple storage devices as a logical volume.

Storage devices (hereinafter, flash storage), which use NAND-type flash memory as the storage medium, have become widespread in recent years. For example, there is the SSD (Solid State Device). Generally speaking, a flash storage is used as a storage device, which is the basis of a logical volume and the final storage area for data. Recently, the high-speed characteristics of the flash storage are being put to good use by using the flash storage as a cache memory in a storage system.

The NAND-type flash memory has the following characteristic features. The NAND-type flash memory is a nonvolatile semiconductor memory, comprises multiple blocks that serve as data storage areas, and each block comprises multiple pages. Data is written to and read from the NAND-type flash memory in page units. However, the NAND-type flash memory is not able to overwrite data (to write data anew to a page where data is being stored). Therefore, a write-destination page in a NAND-type flash memory must be erased beforehand. Thus, in a case where stored data is to be updated, the NAND-type flash memory stores the updated data as valid data in a different erased page (hereinafter, free page), and manages the pre-update data as invalid data. Furthermore, the NAND-type flash memory can only erase data in units of blocks, which comprise multiple pages. From the standpoint of these characteristic features, the NAND-type flash memory is limited as to the number of erases that can be performed for each block. When this limit to the number of erases is exceeded, this block is no longer able to store data. Thus, the flash storage has a life-span.

In accordance with the characteristic features described hereinabove, when the free pages diminish, data can no longer be written, and a free page must be created by erasing the invalid data, but the data can only be erased in block units. Thus, in order to erase the invalid data, the valid data must first be copied to a different block before the data inside the block can be erased. This process is called reclamation. When a copy process occurs as a result of reclamation, read/write performance drops in accordance with the load. A data write to a different page is linked to a data erase inside the copy-source block, and becomes the cause of flash memory degradation.

Patent Literature 1 discloses technology, which, when storing data in a flash storage, which is the final storage area, prolongs the life of the flash storage by leveling the number of erases in accordance with a storage controller notifying the flash storage of information related to the frequency with which the data is updated and having the flash storage store data for which the update frequency is high in a block having a low number of erases.

CITATION LIST

Patent Literature

PTL 1: WO 2012/137242

SUMMARY OF INVENTION

Technical Problem

A cache memory should be faster than the final storage area. Data is updated more frequently in the cache memory than in the final storage area. Thus, when a flash storage like a NAND-type flash memory is used as a cache memory, there is the danger of the flash storage becoming more susceptible to degradation, and of the flash storage reaching the end of its life in a short period of time. Consequently, in a case where a flash storage is used as the cache memory, it is necessary to curb a drop in performance and the degradation of the flash memory resulting from the copy processing that accompanies an internal control, such as reclamation.

In Patent Literature 1, the notification of an update frequency is disclosed, but there is nothing disclosed about using information related to the control of the cache memory.

Since the cache memory is used for temporarily storing data, the stored data is erased at some time. Thus, there exists cache memory-specific control information that does not exist in a case where a flash storage is used as the final storage area. An object of the present invention is to use the cache memory-specific control information to enhance the efficiency of internal control in a case where a flash storage is used as the cache memory.

Solution to Problem

A storage system comprises multiple storage devices for storing data, and a storage controller, which comprises a processor and a cache memory in which data to be stored in the multiple storage devices is temporarily stored. The cache memory comprises a nonvolatile semiconductor memory as a storage medium, and, in addition, comprises a cache controller, which is coupled to the nonvolatile semiconductor memory. The nonvolatile semiconductor memory comprises multiple blocks. Each of the multiple blocks is a data erase unit, and, in addition, comprises multiple pages. Each of the multiple pages is a unit for writing and reading data. The processor sends the cache memory data and attribute information, which comprises information related to a period of time during which the data exists in the cache memory. The cache controller receives the data and the attribute information from the processor, and based on the received attribute information and attribute information for data, which is stored in the multiple blocks, selects a storage-destination block for storing the received data, and writes the received data to a page inside the selected storage-destination block.

Advantageous Effects of Invention

According to the present invention, it is possible to use cache memory-specific control information to enhance the efficiency of an internal control in a case where a flash storage is used as the cache memory.

BRIEF DESCRIPTION OF DRAWINGS

FIG. 13 shows an example of the page information at a time point after a valid data save process has been performed.

FIG. 14 shows an example of the page information after a block, which was comprised entirely of invalid pages, has been erased.

FIG. 19 shows an example of the page information at a certain time point.

FIG. 20 shows an example of the page information at a certain time point in the parity creation process.

FIG. 21 shows an example of the page information at a certain time point.

FIG. 22 shows an example of the page information at a certain time point in the parity creation process.

FIG. 23 shows an example of page information, which comprises attribute information for each page.

DESCRIPTION OF EMBODIMENTS

Figure 1:
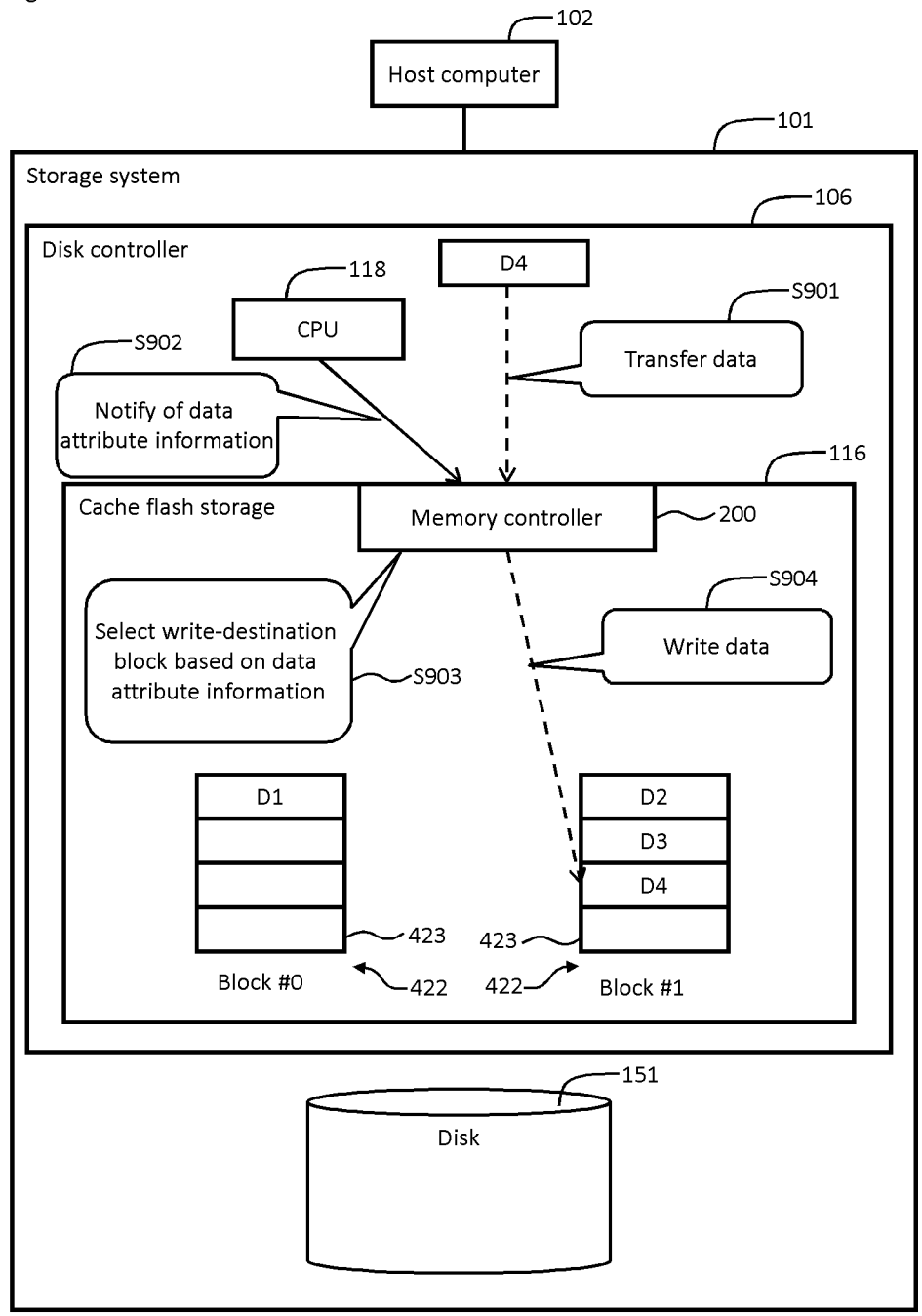
FIG. 1 shows an overview of a data write process.

An embodiment of a storage system, which uses as a cache memory a storage device having a flash memory as a storage medium, will be explained below while referring to the drawings.

As was explained hereinabove, since the cache memory is used for temporarily storing data, the data in the cache memory is erased at some time. The period of time during which the data is stored in the cache memory can be predicted in accordance with an attribute (type or state) of the data. There can also be differences in the periods of time during which the data is stored in the cache memory. In this example, the cache flash storage selects a block for storing data by using a storage period difference, which is based on an attribute of the data in the cache memory. For example, the cache flash storage can concentrate the invalid data in one block by storing multiple pieces of data, which could be erased in a short time, in one block. This makes it possible for the cache flash storage to prevent a copy process from occurring as a result of reclamation.

FIG. 1 shows an overview of the example.

In FIG. 1, a storage system 101 comprises a disk controller 106 for controlling a data write/read to/from a disk 151. The disk controller 106 comprises a CPU 118 and a cache flash storage 116. The cache flash storage 116 comprises a flash memory as the storage medium, and at the time of a write to the disk or a read from the disk, is used to temporarily stored data as a cache.

For example, the disk controller 106, upon receiving a data write request from a host computer 102, stores the data temporarily in the cache flash storage 116, and returns a complete-response to the host computer 102. This improves the response performance of the storage system 101 with respect to the host computer 102.

The disk controller 106, upon receiving a data read request, reads data from the disk 151, stores the data in the cache flash storage 116, and sends the data to the host computer 102. The next time a read request is received for the same data, the disk controller 106 reads the data from the cache flash storage 116 and responds to the host computer 102. This improves the response performance of the storage system 101.

The processing when the data is stored in the cache flash storage 116 will be explained using FIG. 1. Data D1, D2, and D3 show stored data. Data D4 is transferred to the cache flash storage 116 (S901). At this time, the CPU 118 notifies the cache flash storage 116 of a write indication for the data D4, and of the attribute information for the data D4 (S902). A memory controller 200 of the cache flash storage 116 decides which block 422 the data D4 will be written to based on the attribute information of the received data D4, and the attribute information of the stored data D1, D2, and D3 (S903). At this point, the memory controller 200 selects the block, which is storing data of the same attribute. In a case where the data attributes differ, the memory controller 200 may select a block, which is storing data having either the same or a proximate storage period as the attribute. Then, the memory controller 200 writes the data to a page 423 inside the decided block (S904).

As used here, data attribute information is information showing an attribute of the data, and, for example, is information showing either the type or state of data in the storage system 101. As was explained hereinabove, in the cache memory, the period of time during which this data is stored in the cache can differ in accordance with the either the data type or state. For example, there is data, which may be erased from the cache memory relatively soon, and data, which should be held in the cache memory without being erased for a fixed period of time.

For example, as types of data, there is a "master data" and a "mirror data", which are data written to two cache memories when performing duplexing. In addition, when creating parity in a RAID 5 or a RAID 6, the types of data also include "old data", an "old parity", "new data", and a "new parity". The types of data also include "clean data" and "dirty data", which show states as to whether or not cached data also exists in the disk. Next, the difference in the storage period for each of these data types will be explained.

In a case where the data type is master data, this data is held in the cache memory even after having been written to the disk. This is because the response performance with respect to a request from the host computer 102 can be enhanced when data is being stored in the cache memory. In a case where the data type is mirror data, this data may be discarded after being written to the disk. This is because data duplexing makes data redundant in preparation for a failure prior to the data being written to the disk, and after the data has been written to the disk, there is no problem with discarding the mirror data. That is, the master data is held in the cache memory longer than the mirror data.

In a new parity creation process, the old data and the old parity are no longer needed after the new parity has been created, and are discarded from the cache memory. The new parity is discarded from the cache memory after being written to the disk. This is because the new parity is data created to achieve redundancy inside the storage system 101. That is, it is because a direct read request is not received from the host computer 102 for a new parity, reducing the need for the new parity to be held in the cache memory after being written to the disk more than for new data, for which a direct read request could be received. The new parity may be held in the cache memory in a case where a data write to an adjacent block has occurred so as to update the parity information. This is because the new parity is used as old parity in this case, and as such, holding the new parity in the cache memory makes it possible to lessen the number of read processes from the disk.

Since new data corresponds to the master data and the mirror data described above, the new data is stored in the cache memory for a long period of time. Therefore, the period of time held in the cache memory is the shortest for the old data, and becomes increasingly longer for the old parity, the new parity, and the new data, in that order.

The dirty data must be held in the cache memory at least until written to the disk. The clean data may be discarded from the cache memory since the same data exists in the disk.

As explained hereinabove, the period of time that data is to be held in the cache memory in the future will differ in accordance with the attribute (either the type or state, or a combination thereof) of the data. In this example, the cache flash storage 116 decides a block 422 for storing data using storage period differences based on the data attribute. However, the cache flash storage 116 is not able to determine either the data type or state from the received data itself. The CPU 118 of the disk controller 106 manages the data attribute in order to control the creation of parity and the duplexing of the data. However, since the CPU 118 is unable to recognize a physical block and page inside the cache flash storage 116, it cannot select a page to serve as the data write destination. This is because the CPU 118 transfers data by specifying a logical address provided from the cache flash storage 116.

Consequently, in this example, the CPU 118 of the disk controller 106 executes processing in cooperation with the cache flash storage 116. That is, in this example, the CPU 118, which controls data duplexing and parity creation, notifies the cache flash storage 116 of the data attribute information, and the memory controller 200 decides the data storage destination.

In a case where stored data already exists, the memory controller 200 may decide on a block to store the new data based on the attribute of the stored data. When data has been stored in a free block, the memory controller 200 may configure the attribute of the data stored in the block. The controller 200 may also configure the attribute of the data to be stored in each block beforehand.

The period of time during which data is held in the cache memory, for example, may be a period from when the data was written until it is no longer needed (a period of time up until the CPU 118 determines that the data is redundant), a period from when the data was written until it is erased, or a period from when the data was written until a prescribed process is completed.

Figure 3:
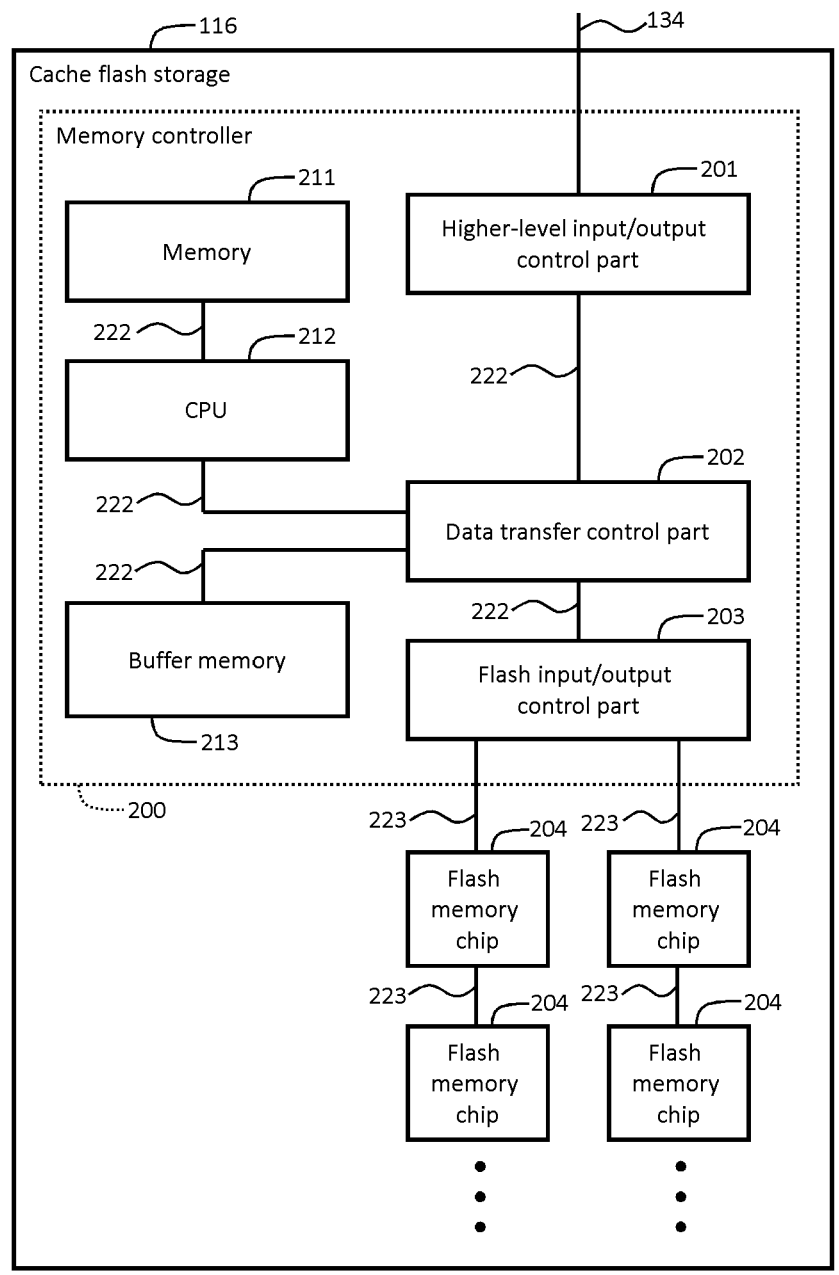
FIG. 3 shows the internal configuration of a cache flash storage.

The cache flash storage 116 may hold information denoting a relationship between the data attribute information and the storage period for each attribute in a memory 211 (refer to FIG. 3). In accordance with this, the cache flash storage 116 may determine the storage period from the attribute information of the received data, and may decide on a data storage destination based in the storage period.

The attribute information, which the CPU 118 sends to the cache flash storage 116, comprises either the type or state of the data, but the storage period may be included. In accordance with this, the cache flash storage 116 decides which block to write the data to based on the storage period included in the attribute information. For example, the cache flash storage 116 selects the write-destination block such that data with storage period lengths that are relatively close (for example, the lengths of the storage periods fall within a prescribed range) are stored in the same block. Or, the cache flash storage 116 selects the write-destination block such that data for which the difference in storage period lengths is relatively large (for example, equal to or larger than a storage period length prescribed value) are stored in different blocks.

For example, it is supposed that values of storage periods from "1" through "10" are obtainable, and that "1" shows the shortest storage period, and "10" shows the longest storage period. In accordance with this, the cache flash storage 116 may store data in a different block for each storage period value. For example, the cache flash storage 116 may store data having relatively short storage periods from 1 through 5 in the same block, and data having relatively long storage periods of 6 through 10 in the same block. In accordance with this, in FIG. 1, when it is supposed that the storage period for the data D1 is the long "10", the storage period for the data D2 and D3 is the short "1", and the storage period for the data D4 is any of "1" through "5", the data D4 is stored in the block #1.

There is a higher likelihood that data, which has been stored in the pages of a single block 422, will be determined as redundant by the CPU 118 at relatively the same time. A block, which is not storing even one piece of necessary data, can be erased as-is without saving (copying) the data to a different block. That is, in accordance with this, since it becomes unnecessary to save (copy) the data to a different block, the drop in performance of the cache flash storage 116 as a result of this save (copy) process is reduced. Furthermore, since the amount of data written to each block 423 is reduced and the number of erases is also reduced, the life of the cache flash storage 116 can be prolonged.

Data, which has been temporarily stored in the cache flash storage 116, is stored in the disk 151 at a prescribed time. Thus, the storing of the cache data in the disk 151 may be referred to as "destaging". Cache data for which destaging has not been completed may be referred to as "dirty data", and cache data for which destaging has been completed may be referred to as "clean data". The destaging of dirty data, for which destaging had not been completed, may be referred to as "cleaning".

A page in which no data has been written, that is, an erased page may be referred to as a "free page". Valid (referenceable) data, which is written to a page, may be referred to as "valid data", and the page comprising this valid data may be referred to as a "valid page". Invalid (unreferenceable) data, which is written to a page, may be referred to as "invalid data", and the page comprising this invalid data may be referred to as an "invalid page". For a certain logical page, the valid data is the latest data, which has been written to the certain logical page, and the invalid data is data, which was written to the certain logical page further in the past than the valid data was written. For example, in a case where a second data has been written to a certain logical page in which a first data was written as the valid data, the second data is the valid data, and the first data becomes the invalid data (hereinafter referred to as "invalidation"). This example will be explained in detail below.

Figure 2:
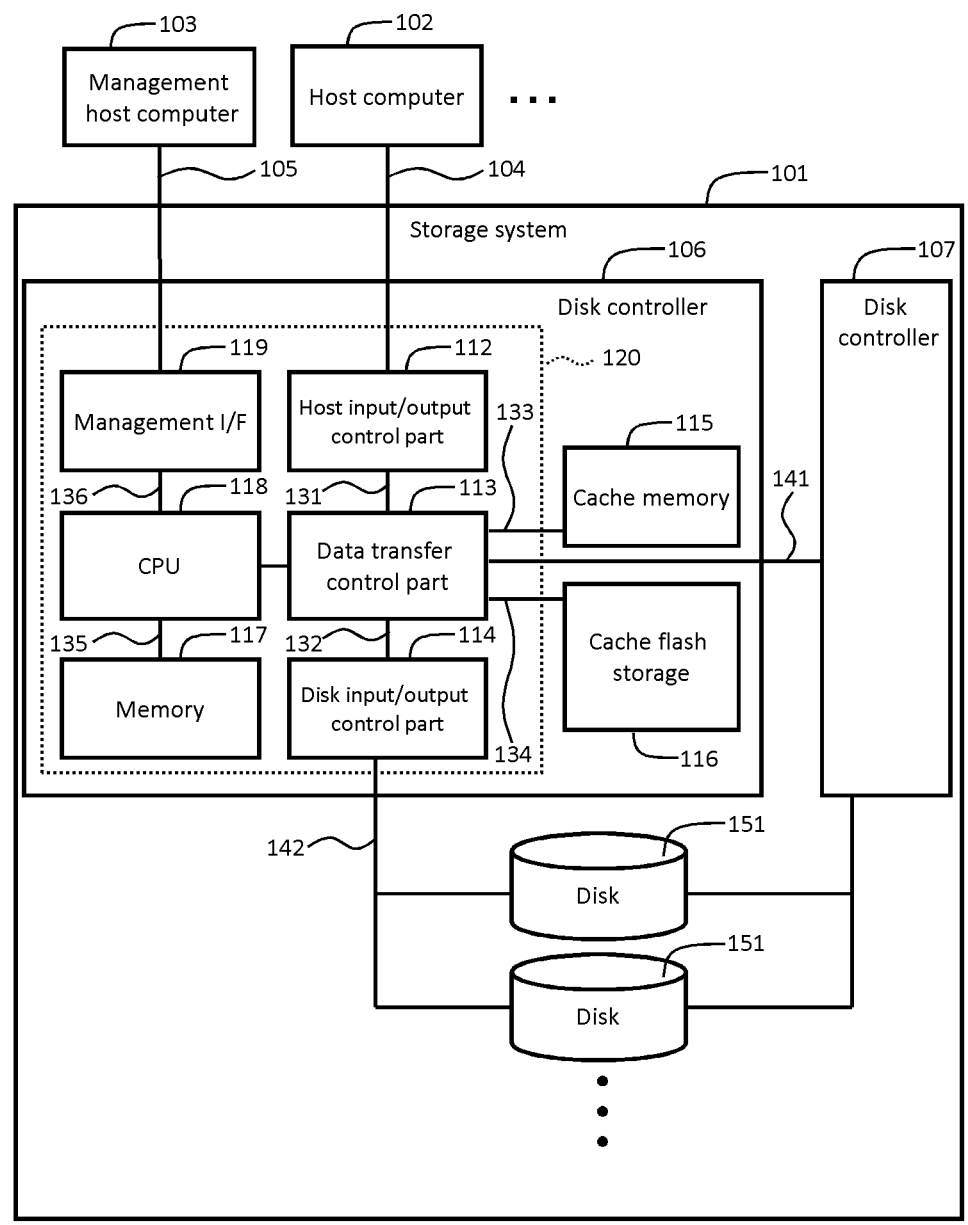
FIG. 2 shows the overall configuration of a storage system.

FIG. 2 shows the overall configuration of the storage system.

A host computer 102 and a management host computer 103 are coupled to the storage system 101. The host computer 102 comprises a communication port (not shown in the drawing), and communicates with the storage system 101 via a connection path 104 like a communication network by way of this communication port. The management host computer 103 also comprises a communication port (not shown in the drawing), and communicates with the storage system 101 via a connection path 105 like a communication network by way of this communication port.

The host computer 102 is an apparatus (for example, either a computer or a server) for reading/writing data from/to a logical volume provided from the storage system 101. The host computer 102 sends a data access indication (either a write indication or a read indication) to the storage system 101. Information denoting an access destination, for example, information comprising the ID of the access destination logical volume (for example, a LUN (Logical Unit Number)) and the address (for example, a LBA (Logical Block Address)) of the access destination area (an area in the access destination logical volume) is associated with the access indication. There may also be a case where an access indication is received from another storage system. The management host computer 103 is a computer for managing the storage system.

In FIG. 2, the host computer 102 and the storage system 101 are directly coupled, but another coupling configuration may be used. For example, multiple host computers 102, the management host computer 103, and the storage system 101 may be coupled together via a SAN (Storage Area Network). In the SAN, for example, a protocol such as either a FC (Fibre Channel) or an iSCSI (Small Computer System Interface) may be used. Also, the connection path 104 and the connection path 105 may be the same connection path.

The storage system 101 internally comprises disk controllers 106 and 107. The disk controller 106 and the disk controller 107 are coupled via an internal bus 141, which makes two-way communications possible. Either one or multiple disks 151 are coupled to the disk controllers 106 and 107 via a connection path 142.

The disk 151 is an apparatus where data is ultimately stored. For example, a HDD (Hard Disk Drive) based on a standard such as FC, SAS, or ATA, and a flash SSD (Solid State Device) are used in the disk 151. In this embodiment, the "disk" may be a disk-type storage device (for example, a HDD), or may be a non-disk-type storage device (for example, a SSD).

The disk controller 106 controls the writing/reading of data to/from the disk 151. The disk controller 106 comprises a host input/output control part 112, a data transfer control part 113, a disk input-output control part 114, a memory 117, a CPU (Central Processing Unit) 118, a management I/F 119, a cache memory 115, and a cache flash storage 116. These elements 112 through 119, for example, are each pieces of hardware, and are coupled via internal buses 131 through 136. The disk controller 107 has the same configuration as the disk controller 106, and as such an explanation thereof will be omitted.

The CPU 118 executes a computer program stored in the memory 117, and realizes various functions provided in the storage system 101. The cache memory 115 and the cache flash storage 116 temporarily store data read from the disk 151 and data to be written to the disk 151. Temporarily means that the data is deleted either after the passage of a prescribed period of time, or after a prescribed process has been completed. This makes it possible to enhance response performance with respect to the host computer 102. The cache memory 115, for example, is a DRAM (Dynamic Random Access Memory), but may be another type of volatile memory (or nonvolatile memory). The cache flash storage 116, for example, is a storage device comprising a NAND-type flash memory as the storage medium. However, the storage medium may be a write-once-read-many-type nonvolatile semiconductor memory, and, for example, may be a MRAM (Magnetic Random Access Memory: a magnetic resistance memory), a PRAM (Phase Change Random Access Memory: a phase change memory), a ReRAM (Resistance Random Access Memory: a resistance change memory), or the like.

As shown in FIG. 2, the disk controller may be duplexed (reference signs 106 and 107). For example, in a case where a failure has occurred in the disk controller 106, the disk controller 107 operates in its place. This increases the fault tolerance of the storage system 101. In this example, it is supposed that the disk controller 106 is the "master side", which executes processing at normal times. It is supposed that the disk controller 107 is the "mirror side", which operates in place of the master-side disk controller when there is a failure. In this example, the disk controllers are duplexed, but the respective hardware inside a single disk controller may be duplexed.

In a case where a data write request has been received from the host computer 102, the CPU 118 of the disk controller 106 temporarily stores this data in either the cache memory 115 or the cache flash storage 116 via the host input/output control part 112 and the data transfer control part 113. The data, which is temporarily stored either in the cache memory 115 or in the cache flash storage 116, may be referred to as cache data. Then, the CPU 118 of the disk controller 106 reads the data from either the cache memory 115 or the cache flash storage 116 via the data transfer control part 113, and stores the data in the disk 151 by way of the disk input/output control part 114. In a case where the disk controller 106 and the disk controller 107 are duplexed here, the data is transferred from the disk controller 106 to the disk controller 107, and the same processing can be performed by the disk controller 107 as well.

In a case where a read indication has been received from the host computer 102, the CPU 118 of the disk controller 106 reads the data from the disk 151, and temporarily stores the data in either the cache memory 115 or the cache flash storage 116. The data, which is temporarily stored in either the cache memory 115 or the cache flash storage 116, is also referred to as cache data. Then, the CPU 118 of the disk controller 106 reads the data from either the cache memory 115 or the cache flash storage 116, and transfers the data to the host computer 102.

According to FIG. 2, the cache flash storage 116 exists inside the disk controller 106, and a controller part (in FIG. 2, the part comprising elements of the disk controller 106 other than the cache flash storage 116) 120 is coupled to the cache flash storage 116. However, the configuration is not limited to the configuration shown in FIG. 2, and may be another configuration. For example, the cache flash storage 116 may comprise a prescribed IF, and may be coupled to the data transfer control part 113 via this IF. Or, the cache flash storage 116 may comprise a prescribed IF, and may be coupled to the connection path 142 the same as the disk 151. Or, the storage device, which is used as the cache, may be the cache flash storage 116 alone without there being a cache memory 115.

Or, the cache memory 115 may be a configuration, which uses the same physical memory as the memory 117.

FIG. 3 shows the internal configuration of the cache flash storage 116.

The cache flash storage 116 comprises one or more flash memory chips 204, and a memory controller 200, which is coupled to the one or more flash memory chips 204. The memory controller 200, for example, comprises a higher-level input/output control part 201, a data transfer control part 202, a flash input/output control part 203, a CPU 212, a memory 211, and a buffer memory 213. The memory 221, the CPU 212, the buffer memory 213, the higher-level input/output control part 201, the data transfer control part 202, and the flash input/output control part 203 are coupled via an internal bus 222 that enables two-way communications. The flash input/output control part 203 and the flash memory chip 204, and the flash memory chips 204 themselves are coupled via a flash memory bus 223 that enables two-way communications.

The higher-level input/output control part 201 is coupled to the data transfer control part 113 through the internal bus 134 of the disk controller 106, and controls the input/output of data between the disk controller 106, which is the higher-level apparatus, and the cache flash storage 116.

The data transfer control part 202 controls the transfer of data inside the cache flash storage 116. That is, the data transfer control part 202 controls the exchange of information among the CPU 212, the buffer memory 213, the higher-level input/output control part 201, and the flash input/output control part 203.

The flash input/output control part 203 controls the input/output of data to the flash memory chip 204 through the flash memory bus 223.

The CPU 212 is coupled to the data transfer control part 202 via the internal bus 222, executes a variety of operations in accordance with a program stored in the memory 211, and controls the cache flash storage 116 in its entirety.

The buffer memory 213 temporarily stores data, which is exchanged between the higher-level input/output control part 201 and the flash input/output control part 203. For example, data, which has been received from the higher-level input/output control part 201, is temporarily stored in the buffer memory 213 and transferred to the flash input/output control part 203. Data acquired from the flash memory chip 204 may be temporarily stored in the buffer memory 213.

Not all of the various configuration components shown in FIG. 3 are necessarily required for configuring the cache flash storage 116. For example, the cache flash storage 116 may be configured using a chip, which integrates the CPU 212 and other control parts. Or, the cache flash storage 116 may be configured using a chip that integrates only one of these parts. Or, the configuration may be such that the memory 211 and the buffer memory 213 are physically the same memory.

Figure 4:
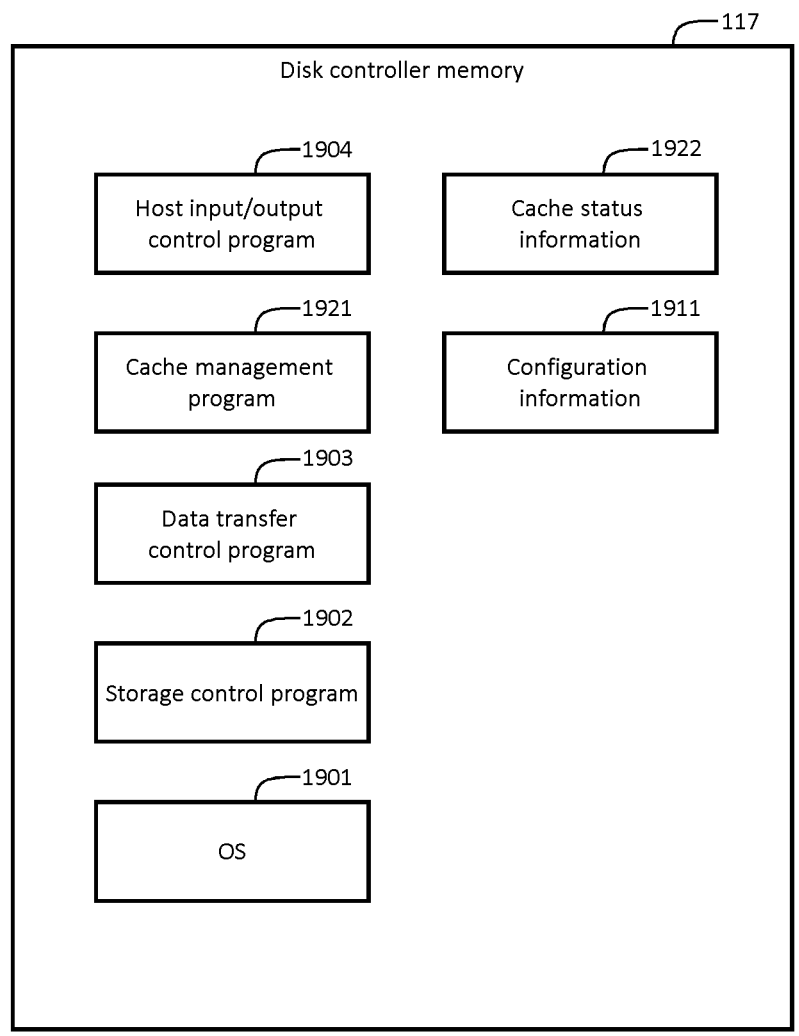
FIG. 4 shows an example of programs and information stored in the memory of a disk controller.

FIG. 4 shows an example of programs and information stored in the memory 117 of the disk controller 106.

The memory 117 stores an OS (Operating System) 1901, a storage control program 1902, a data transfer control program 1903, a host input/output control program 1904, and a cache management program 1921. These programs can be executed in the CPU 118. The memory 117 stores cache status information 1922 and configuration information 1911. This information can be used in a program executed by the CPU 118.

The OS 1901 is a program for performing basic processing, such as scheduling at the time the CPU 118 executes each program.

The storage control program 1902 performs RAID control for the multiple disks 151 comprising the storage system 101.

In a case where control is performed using RAID 5 or 6 here, the storage control program 1902 controls the creation of parity. The disk controller 106 may further comprise a parity creation circuit, and may use this circuit to create parity. Or, the disk controller 106 may create parity by executing a parity creation program using the CPU 118. The storage control program 1902 controls the disk input/output control part 114. That is, the storage control program 1902 performs the writing, reading, and erasing of data with respect to the disk 151.

The data transfer control program 1903 controls the data transfer control part 113. That is, the data transfer control program 1903 controls the data transfer control part 113 to control the exchange of data among the CPU 118, the cache memory 115, the cache flash storage 116, the host input/output control part 112, and the disk input/output control part 114.

The host input/output control program 1904 controls the host input/output control part 112. That is, the host input/output control program 1904 controls the exchange of data between the host computer 102 and the disk controller 106.

The cache management program 1921 manages the cache data stored in the cache memory 115 and/or the cache flash storage 116.

The cache status information 1922 comprises information related to the status of the cache data stored in the cache memory 115 and/or the cache flash storage 116. The cache status information 1922, for example, is used by the cache management program 1921. The cache status information 1922 will be explained in detail further below.

The configuration information 1911 comprises information on the components, which comprise the storage system 101, and the data stored in the storage system 101. The configuration information 1911, for example, is used in the storage control program 1902. The configuration information 1911 comprises the ID of a disk, which comprises the RAID group, a RAID level, the ID of a logical volume, and the ID of a disk and/or a RAID group, which comprises the logical volume.

Figure 5:
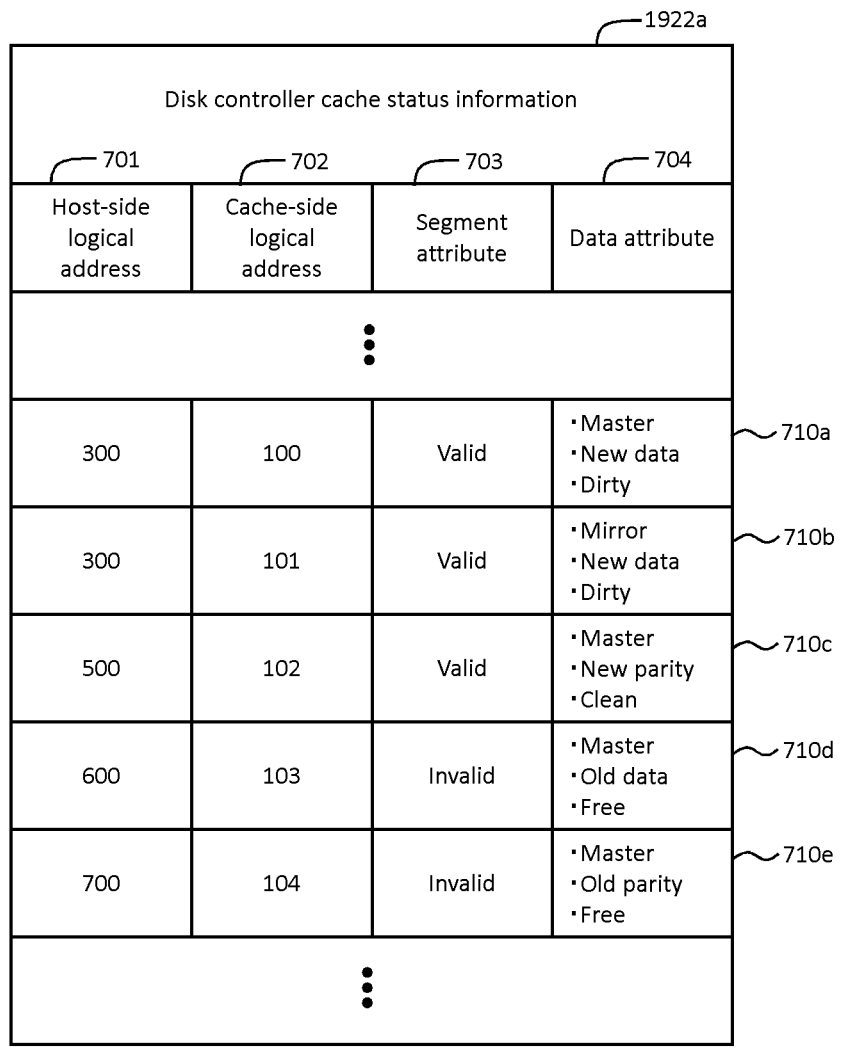
FIG. 5 shows an example of cache status information of the disk controller.

FIG. 5 shows the cache status information 1922a of the disk controller 106.

The cache status information 1922a, for example, comprises as items a host-side logical address 701, a cache-side logical address 702, a segment attribute 703, and a data attribute 704.

The host-side logical address 701 is the logical address, which the disk controller 106 provides to the host computer 102. That is, the host-side logical address 701 is the logical address on the logical volume, which the host computer 102 recognizes and specifies at access time. The CPU 118 reserves a cache-side logical address 702 upon receiving a data write/read indication specifying the host-side logical address from the host computer 102. The CPU 118 also updates the data attribute 704 in accordance with either the type or state of the data. Then, the CPU 118 specifies a cache-side logical address, transfers the data to the cache flash storage 116, and notifies the cache flash storage 116 of the data attribute. The data attribute may comprise a command, which instructs a data write. In a case where a parity is created, the CPU 118 specifies a cache-side logical address, transfers the old data, the old parity, and the new parity to the cache flash storage 116, and notifies the cache flash storage 116 of the data attribute of each piece of data.

The cache-side logical address 702 is managed by being partitioned into units of segments of a prescribed size. In this example, it is supposed that the segment size is the same as the size of a page in the flash memory. Information as to whether the data corresponding to a segment is valid or invalid is stored in the segment attribute 703. The CPU 118 recognizes that data, for which the segment attribute 703 is "valid", exists in the cache memory. The CPU 118 recognizes that data, for which the segment attribute 703 is "invalid", does not exist in the cache memory. In a case where the CPU 118 has determined that the data will be erased from the cache memory, the CPU 118 configures the segment attribute 703 to "invalid" and configures the data attribute 704 to "free". Then, the CPU 118 notifies the cache flash storage 116 to the effect that the attribute of the data of this logical address is "free". The cache flash storage 116 receives this notification, recognizes that the target data is "free", and manages this data as invalid data.

Also, in a case where the CPU 118 has changed the cache status information 1922a, the CPU 118 may notify the cache flash storage 116 of this change. The cache flash storage 116 receives the notification and updates the cache status information 314a. The CPU 118 may also notify the cache flash storage 116 of the minimum required storage period 604 rather than the data attribute 603.

The storage period 604 may be calculated by the memory controller 200. For example, the memory controller 200, after writing the data to the block for each data attribute, may measure the time until this data becomes invalid (or is erased), and may decide the value of the storage period 604 based on this measured time.

The cache flash storage 116 may use the data attribute 603 and/or the storage period 604 included in the cache status information 314a stored in itself to notify the disk controller 106 of the processing recommended in this cache data. This method is effective in a case where the storage period 604 differs from the initial prediction. For example, it is supposed that cache data, which is stored in the valid pages corresponding to "200", "201", "210", and "211" in the logical address 504 column of page information 316g shown in FIG. 21, is clean data, that the frequency with which this data is referenced is low, and that the affect would be small in a case where this data was discarded (invalidated). In accordance with this, the cache flash storage 116 may recommend that the disk controller 106 discard (invalidate) this data since the invalidation of this cache data would reduce its own resource usage.

In a case where the logical capacity of the cache flash storage 116 managed by the disk controller 106 differs from the physical capacity actually possessed by the cache flash storage 116, the disk controller 106 may notify the cache flash storage 116 of a logical address, which has become redundant on the disk controller 106 side. This makes it possible for the cache flash storage 116 to release the area corresponding to the logical address, which has become redundant, and to reduce the effective used capacity.

The logical address 601 (or the cache-side logical address 702) may be a different address system in accordance with a page attribute 602 (or the segment attribute 703) being "valid" or "invalid". That is, the configuration may be such that a determination as to whether the page attribute (or the segment attribute) is "valid" or "invalid" can be made in accordance with which address system the value of the logical address 601 (or the cache-side logical address 702) belongs to. This method is effective in a case where the cache flash storage 116 provides the disk controller 106 with a virtual logical space.

Figure 6:
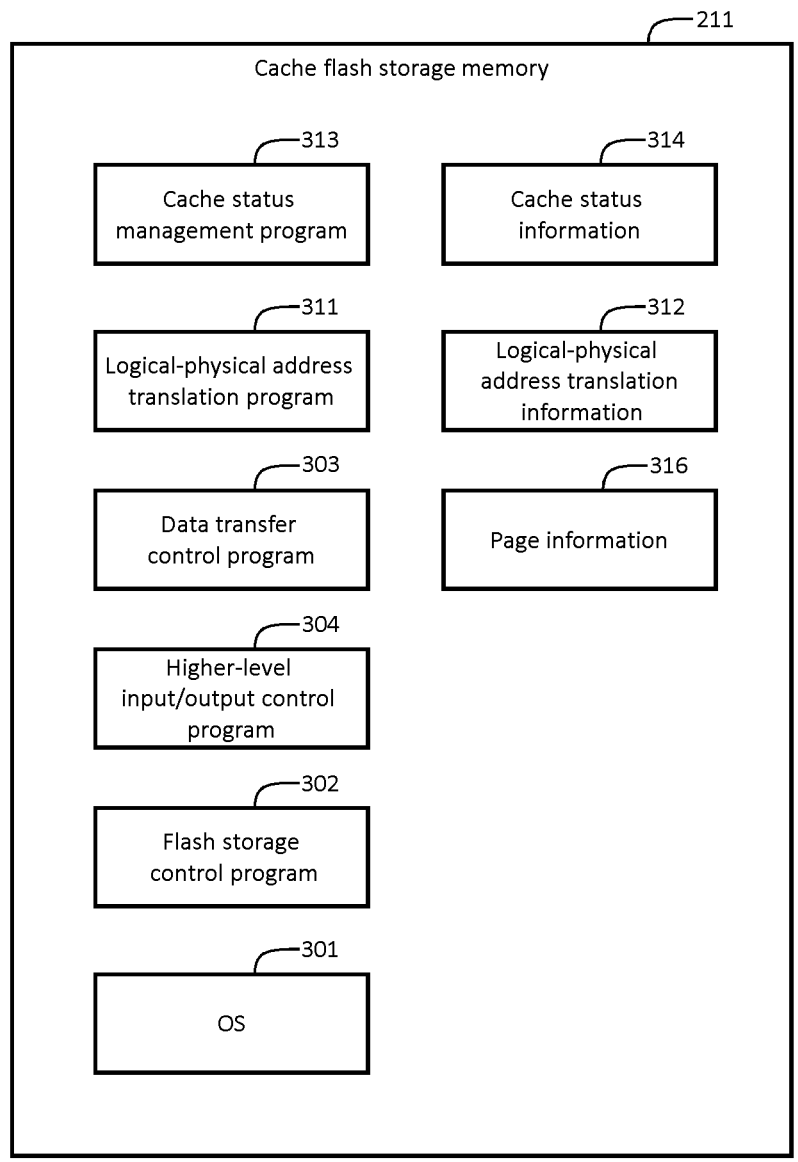
FIG. 6 shows an example of the programs and information stored in the memory of the cache flash storage.

FIG. 6 shows an example of programs and information stored in the memory 211 of the cache flash storage 116.

The memory 211 stores an OS 301, a flash storage control program 302, a data transfer control program 303, a higher-level input/output control program 304, a logical-physical address translation program 311, and a cache status management program 313. These programs are capable of being executed in the CPU 212. The memory 211 stores cache status information 314, logical-physical address translation information 312, and page information 316. This information can be used in a program executed by the CPU 212.

The OS 301 performs basic processing, such as scheduling at the time the CPU 212 executes each program.

The data transfer control program 303 controls the data transfer control part 202. That is, the data transfer control program 303 controls the exchange of data among the CPU 212, the higher-level input/output control part 201, and the buffer memory 213.

The higher-level input/output control program 304 controls the higher-level input/output control part 201. That is, the higher-level input/output control program 304 controls the exchange of data with the data transfer control part 113 of the disk controller 106, which is the higher-level apparatus.

The flash storage control program 302 controls the entire cache flash storage 116. For example, the flash storage control program 302 manages a logical volume, which is provided to the higher-level apparatus. For example, the flash storage control program 302 manages the buffer memory 213. For example, the flash storage control program 302 controls the flash input/output control part 203, and performs the writing, reading, and erasing of data with respect to the flash memory chip 204.

The cache status information 314 comprises information showing what the status of the cache data, which is stored in the cache flash storage 116, is in the higher-level apparatus (in this embodiment, a CPU 118 outside of the cache flash storage 116). The cache status information 314 will be explained in detail further below.

The cache status management program 313 updates the cache status information 314 based on attribute information received from outside the cache flash storage 116.

The logical-physical address translation information 312 comprises information showing a corresponding relationship between a logical address and a physical address. That is, the logical-physical address translation information 312 comprises the corresponding relationship between a logical address, which the cache flash storage 116 provides to the higher-level apparatus, and the physical address of the flash memory managed internally by the cache flash storage 116.

The logical-physical address translation program 311 uses the logical-physical address translation information 312 to translate a logical address to a physical address. That is, logical-physical address translation program 311, upon receiving an input/output request comprising a logical address from the higher-level apparatus, uses the logical-physical address translation information 312 to translate the logical address to a physical address of the flash memory chip 204. This makes it possible to identify the physical storage area in which the data corresponding to the input/output request has been stored.

Figure 7:
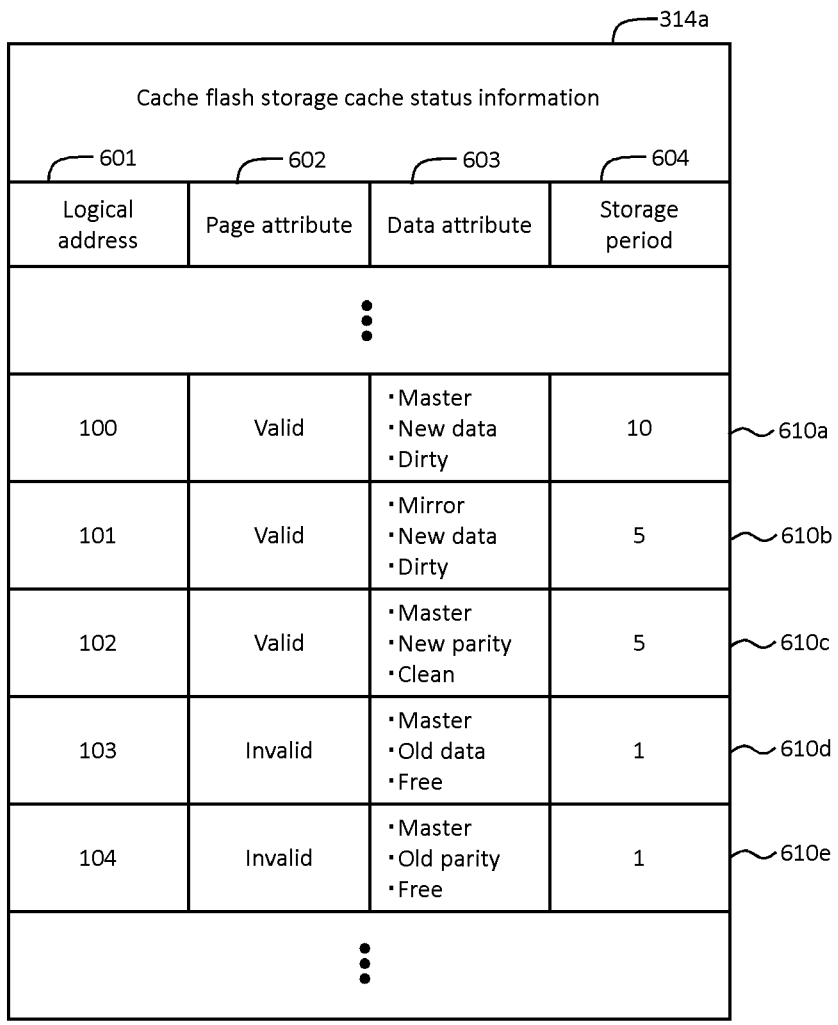
FIG. 7 shows an example of cache status information of the cache flash storage.

FIG. 7 shows the cache status information 314a of the cache flash storage 116.

The cache status information 314a, for example, comprises as items a logical address 601, a page attribute 602, a data attribute 603, and a storage period 604.

The logical address 601 shows a logical address in the cache flash storage 116.

The page attribute 602 shows the attribute of a page, which corresponds to the logical address shown in the logical address 601. The information stored in the page attribute 602 is the same as that of the page attribute 503 shown in the page information 316.

The data attribute 603 shows the attribute of data, which is being stored in the page corresponding to the logical address shown in the logical address 601. The data attribute 603, for example, may comprise information showing whether the relevant data is on the master side or the mirror side. The data attribute 603, for example, may comprise information showing whether the relevant data is new data, old data, new parity or old parity. The data attribute 603 may also comprise information showing whether the relevant data is clean data, dirty data, or free data (that is, data, which has been invalidated).

The data attribute 603 is notified from the CPU 118, which is outside of the memory controller 200. Then, the memory controller 200 updates the data attribute 603. When writing data, the memory controller 200 references the data attribute 603 and selects a block, which will become the storage destination of the data.

The storage period 604 shows a predicted storage period corresponding to the data attribute 603. For example, it is supposed that the larger the value of the storage period 604 is, the longer the period of time the data is expected to be stored in the cache, and that the smaller the value of the storage period 604 is, the shorter the period of time the data is expected to be stored in the cache. The storage period 604 is updated based on the data attribute 603 notified from the CPU 118, which is the higher-level apparatus. Or, the storage period 604 may be included directly in a notification from the disk controller 106, which is the higher-level apparatus.

The storage period 604 is configured so as to relatively differ between data types or states. For example, in a case where the data attribute is new data, either the controller 120 or the cache flash storage 116 configures the storage period to be longer than when the data attribute is old data. For example, in a case where the data attribute is new parity, either the controller 120 or the cache flash storage 116 configures the storage period to be longer than when the data attribute is old parity. For example, in a case where the data attribute is dirty data, either the controller 120 or the cache flash storage 116 configures the storage period to be longer than when the data attribute is clean data. For example, the CPU 118 configures the attribute information of the relevant data to clean data in a case where data, which was read from the disk 151 in accordance with a read request from the host computer 102, is to be stored in the cache flash storage 116.

Figure 8:
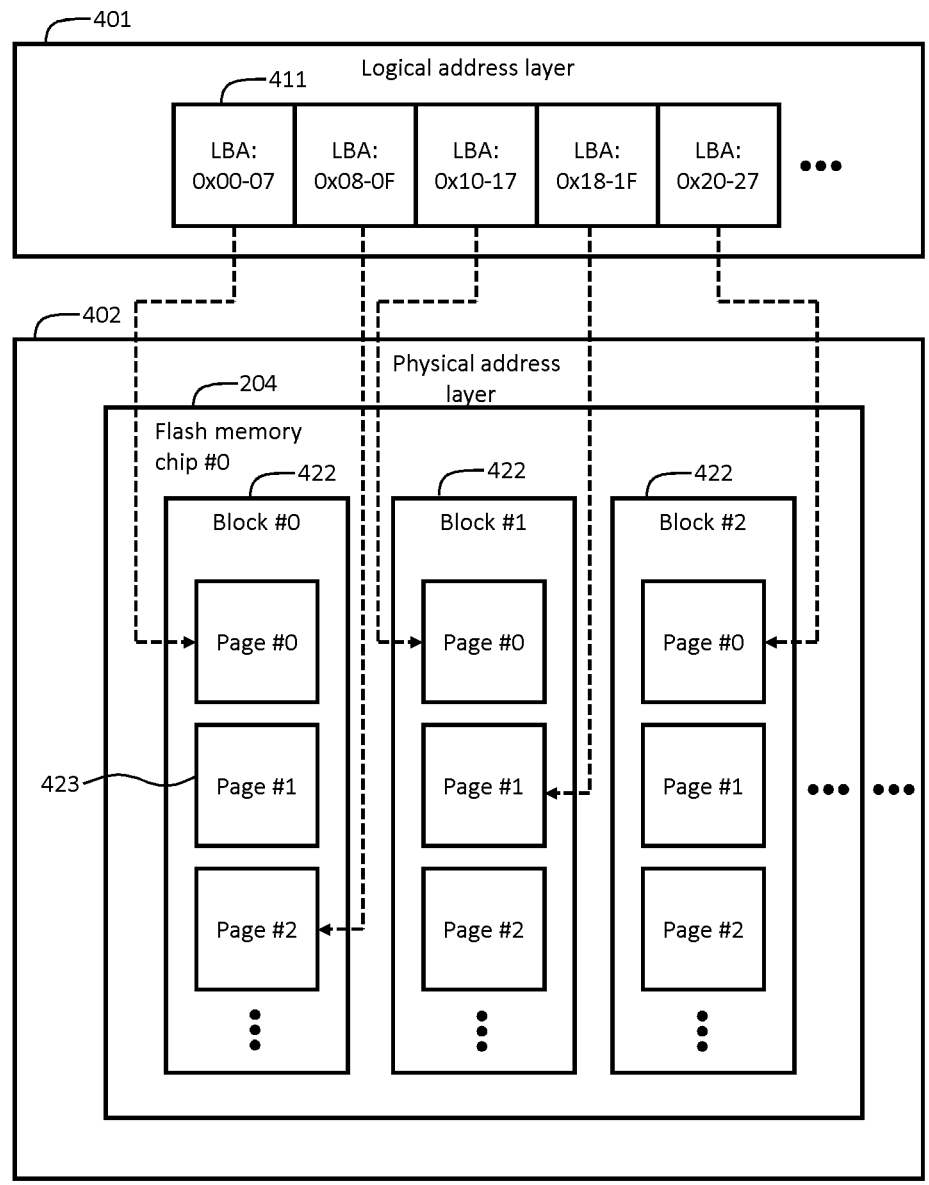
FIG. 8 shows an example of a corresponding relationship between a logical address and a physical address.

FIG. 8 is a schematic diagram showing an example of a corresponding relationship between a logical address and a physical address.

A logical address layer 401 comprises a series of logical block addresses (LBA (Logical Block Address)). The logical block address shows a location in a logical space, which the cache flash storage 116 provides to the higher-level apparatus (in this embodiment, the CPU 118 of the disk controller 106 (107)). The logical address space is managed inside the cache flash storage 116 by being partitioned into multiple logical pages 411. In this example, it is supposed that the size of the logical page 411 is the same as the size of a page, which is the unit for a flash memory chip 204 read and write. Then, it is supposed that a single logical page 411 comprises eight logical block addresses.

The logical-physical address translation program 311 uses the logical-physical address translation information 312 to connect an area of the logical address layer 401 to an area of the physical address layer 402.

In the cache flash storage 116, the physical address layer 402 comprises multiple flash memory chips 204. The flash memory chip 204 comprises multiple blocks 422. The block 422 comprises multiple pages 423. In a flash memory, the reading and writing of data can only be performed in page 423 units. Also, in a flash memory, the erasing of data can only be performed in block 422 units.

The CPU 118 specifies a logical block address and issues a data read/write indication to the cache flash storage 116. That is, the physical address layer is not recognizable from outside the cache flash storage 116.

In the logical-physical address translation information 312, for example, one logical page 411 is allocated to one page 423. For example, the logical page 411 comprising the LBA 0x00 through 0x07 is allocated to page #0 of block #0 in the flash memory chip #0. In accordance with this, in a case where a read request for the LBA 0x00 through 0x07 has been issued from the disk controller 106, which is the higher-level apparatus with respect to the cache flash storage 116, the cache flash storage 116 identifies the page #0 in the block #0 of the flash memory chip #0, which is allocated to the logical page 411 of this LBA 0x00 through 0x07, reads the data from this page #0 and returns the result.

The size of the logical page 411 and the size of the page 423 need not be the same. That is, in a case where the size of the logical page 411 is smaller than the size of the page 423, a storage location of the page 423 may be determined for each range that is smaller than the logical space. For example, in FIG. 8, in a case where the size of the logical page 411 is one-half the size of the page 423, each of an LBA 0x00 through 0x03 and an LBA 0x04 through 0x07 may be stored in a different page 423.

Alternatively, in a case where the size of the logical page 411 is larger than the size of the page 423, certain restrictions may be placed on the allocation of the page 423. For example, in a case where an LBA 0x00 through 0x0F is stored in two pages 423, two contiguous pages 423 of the same block 422 may be selected. That is, in a case where multiple pages 423 are to be allocated to one logical page 411, the multiple pages 423 to be allocated thereto may be selected automatically based on a prescribed rule. In accordance with this, since the number of pages 423 to be managed decreases, the amount of information to be managed in the cache flash storage 116 can be reduced.

The processing inside the cache flash storage 116 will be explained next using FIGS. 9 through 14.

Figure 9:
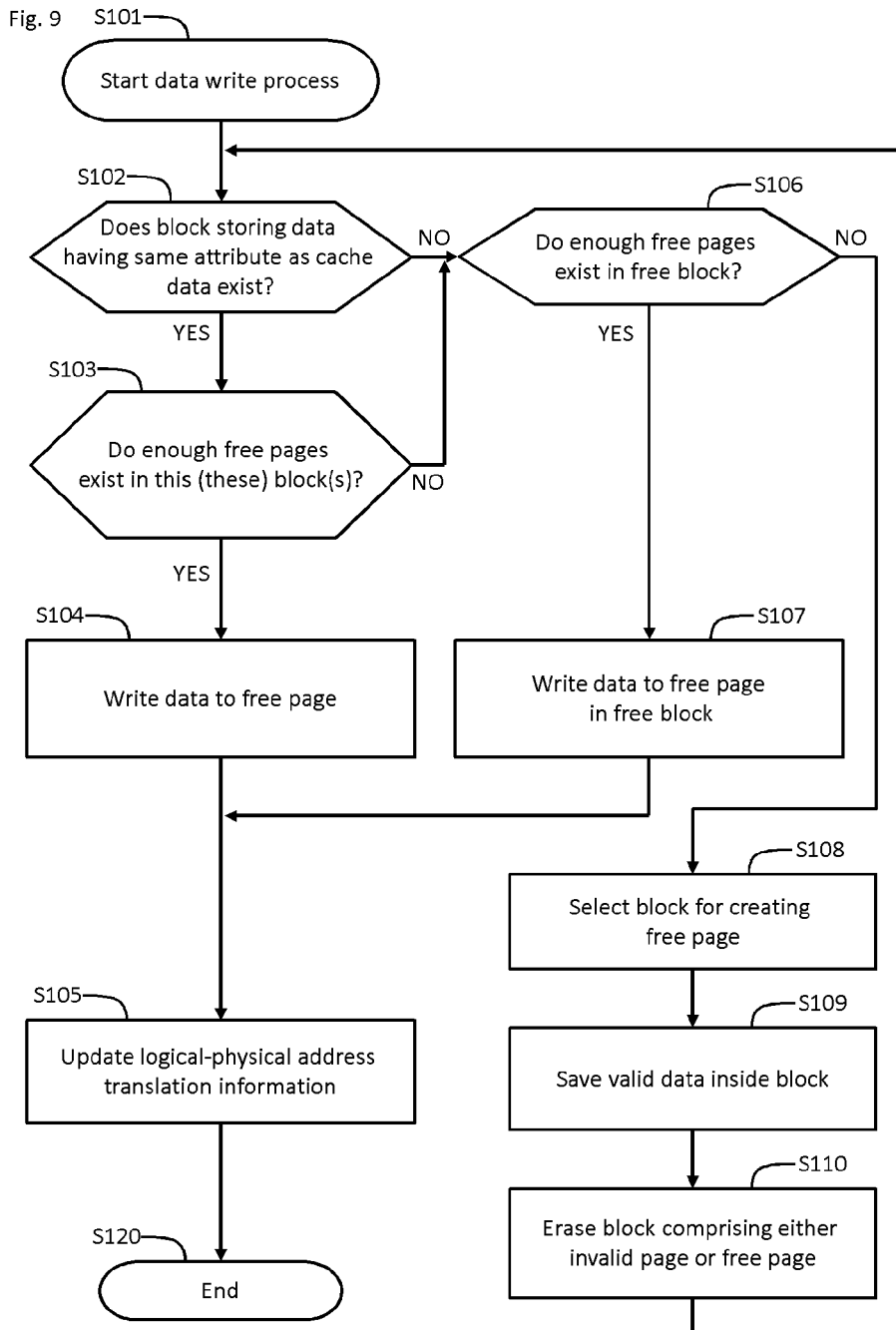
FIG. 9 shows an example of a flowchart of a write process in the cache flash storage.
Figure 10:
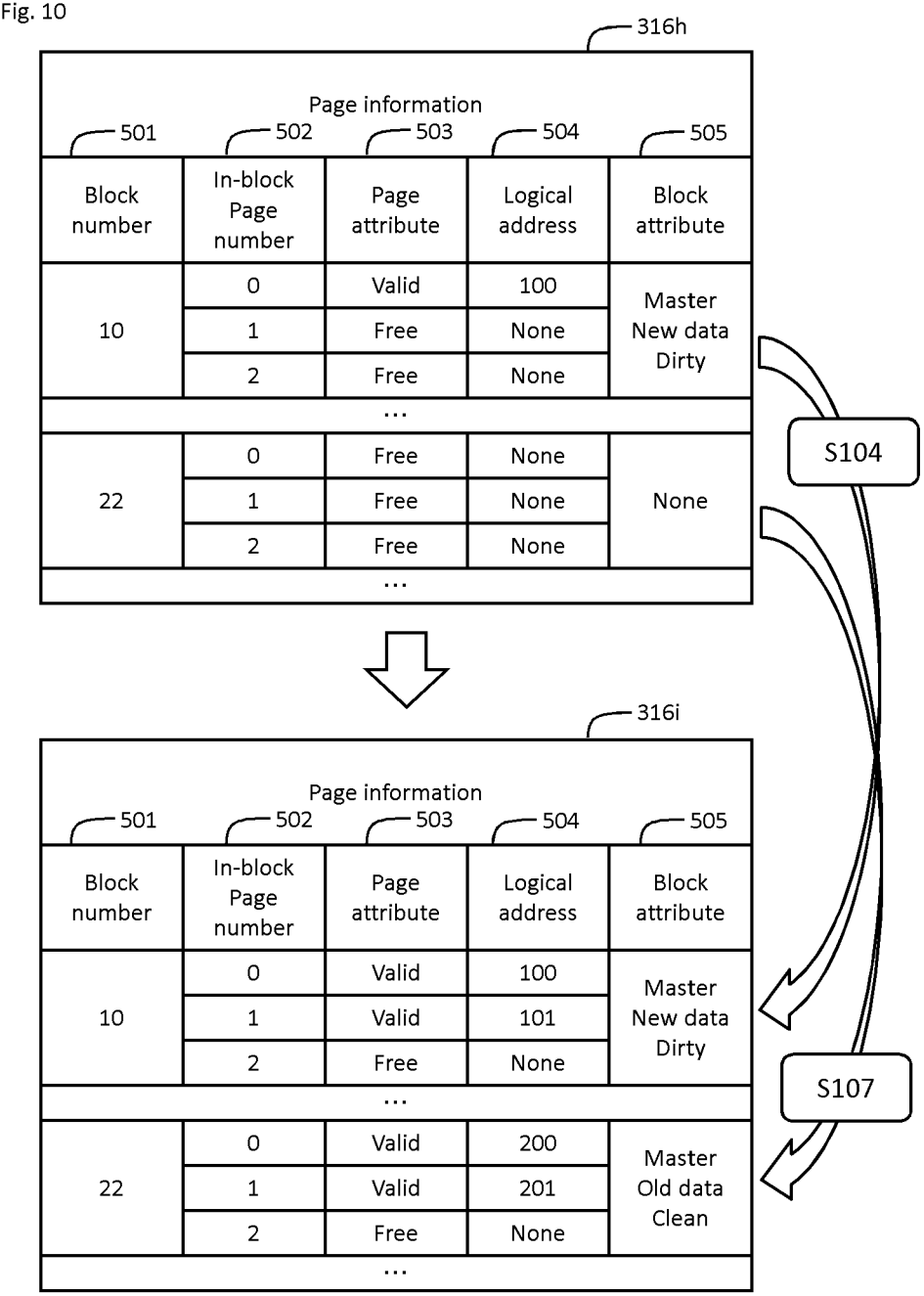
FIG. 10 shows an example of page information at the time of the cache flash storage 116 write process.

FIG. 9 is a flowchart of a write process in the cache flash storage 116. FIG. 10 shows an example of page information at the time of a write process in the cache flash storage 116. The relevant processing will be explained while referring to FIGS. 9 and 10.

The memory controller 200, upon receiving a data (called cache data) write indication from the CPU 118, begins a cache data write process (S101). The attribute information of the cache data is included in the write indication (write command).

The flash storage control program 302, based on the received cache data attribute information, determines whether or not there exists a block in which data having the same attribute as this cache data is stored (S102). When the data stored in the block is not the same attribute, the flash storage control program 302 may determine whether or not there exists a block in which data, which either has the same storage period or falls within a prescribed range, is stored. This is because, by collecting data for which the period of time until the data becomes redundant is either the same or proximate in the same block makes batch erasing possible at reclamation time. In a case where the data attribute is configured in each block, the flash storage control program 302 may select a block for storing the cache data based on the attribute of this block. For example, the flash storage control program 302 references the page information 316h of FIG. 10, and determines whether or not there is a block in which is stored data having the same attribute as the received cache data. For example, in a case where the attributes of the received cache data are "master", "new data", and "dirty", the flash storage control program 302 determines that block "10" of the block number 501 exists as a block in which data having the same attributes is stored.

In a case where an equivalent block exists in the determination of Step S102 (S102: YES), the flash storage control program 302 determines whether or not there are enough free pages in the relevant block to store the data (S103). In a case where there exists multiple blocks in which data having the same attributes as the cache data is stored, the flash storage control program 302 may determine whether or not the total number of free pages in the multiple blocks is sufficient for storing the cache data. In a case where data having the same attributes can be consolidated, the flash storage control program 302 may store the data by dividing it up among multiple blocks. For example, in a case where two or more pages of cache data is to be written, the flash storage control program 302 may select blocks in which data having the same attributes is stored from different flash memory chips 204, transfer the cache data in parallel to each flash memory chip 204, and write the cache data to each block.

In a case where enough free pages exist in the block in the determination of Step S103 (S103: YES), the flash storage control program 302 writes the cache data to the free pages (S104). That is, the flash storage control program 302 writes the cache data to the page, which corresponds to "1" of the in-block page number 502 corresponding to block "10" of the block number 501, in the page information 316h of FIG. 10.

Then the flash storage control program 302 updates the logical-physical address translation information 312 such that the logical address, which corresponds to the written cache data, references the physical address, which corresponds to the page into which the cache data was written (S105), and ends the relevant processing (S120).

In a case where an equivalent block does not exist in the determination of either Step S102 or S103 (S102: NO, S103: NO), the flash storage control program 302 determines whether or not there are enough free pages in the free block to store the data (S106). That is, the flash storage control program 302 writes the cache data to the free blocks such that data having different data attributes (or storage periods) are not intermixed in one block. In a case where the size of the cache data is larger than one block, the flash storage control program 302 stores the cache data in multiple free blocks. That is, the flash storage control program 302 need only be able to reserve free pages having enough capacity to store the cache data.

In a case where enough free pages exist (S106: YES), the flash storage control program 302 writes the cache data to the one or more free pages (S107). In a case where the attributes of the received cache data here are either "master", "old data", and "clean" or "master", "old parity", and "clean", a block having the same block attribute 505 does not exist in the page information 316h of FIG. 10. In accordance with this, the flash storage control program 302 writes either old data or old parity to the free block corresponding to "22" of the block number 501. Then, the flash storage control program 302 configures "master", "old data", and "clean", which are the attributes of the stored cache data, in the block attribute 505 corresponding to "22" of the block number 501.

Then, the flash storage control program 302 updates the logical-physical address translation information 312 such that the logical address, which corresponds to the written cache data, references the physical address, which corresponds to the new page (S105), and ends the relevant processing (S120).

In a case where there are not enough free pages in Step S106 (S106: NO), the flash storage control program 302 selects a block 422 for erasing data (S108). The flash storage control program 302 may select a block having few valid pages as the erase-target block. This is because fewer valid pages results in a smaller amount of data to be copied, and also makes it possible to create a larger number of free pages. The flash storage control program 302 may select the erase-target block based on a condition, such as the block for which the longest period of time has elapsed since data was last written. Then the flash storage control program 302 saves the valid data included in the block 422, which was selected as the erase target, to a different block comprising a free page (S109).

At this point, the flash storage control program 302 may select a save-destination block based on the attribute of the data stored in the erase-target block. For example, the flash storage control program 302, in a case where the attribute of the data stored in the erase-target block shows that the storage period is long, may save the data to a block having a large number of erases. In accordance with this, the period of time until this data is next erased will be long, and it will be possible to curb the increase in the number of erases for this block.

In the flash memory, the longer the elapsed time period after storing data, the greater the increase in error bits inside the data. Thus, in the flash memory, a refresh process, in which data is read, error correction is executed, and the data is stored in a different block is executed for as long as error correction is possible. In the refresh process, data having an attribute in which the storage period is long may be stored in a block having a large number of erases. The refresh process may be executed on a regular basis, or may be executed in a case where the number of error bits exceeds a threshold when data is read.

The valid data is the data of a physical page allocated to a logical page at this time point. Since the valid data must not be erased, as explained hereinabove, the valid data must be saved to a different block comprising a free page. The valid data save is a process which copies the valid data to a free page in a different block and updates the allocation relationship in the logical-physical address translation information 312. In a case where the valid data has been saved, the copy-source valid data becomes redundant, and as such, transitions to invalid data. That is, the valid page, which had stored the valid data, becomes an invalid page. When the valid data save is complete, the erase-target block constitutes only an invalid page and a free page, and as such, can be erased.

After the valid data save has been completed in Step S109, the flash storage control program 302 erases the data in the erase-target block (S110). In accordance with the erase, all the pages in the block can be used as free pages. That is, the erase increases free pages for writing. Consequently, the flash storage control program 302 returns to Step S102 and once again makes a determination (S102).

In FIG. 9, the flash storage control program 302 creates free pages as a part of the write process (S108 through S110). However, the flash storage control program 302 may asynchronously execute the creation of the free pages separate from the write process. This enhances the write performance of the cache flash storage 116. Next, page information, which transitions in accordance with the flow of the write process shown in FIG. 9, will be explained.

Figure 11:
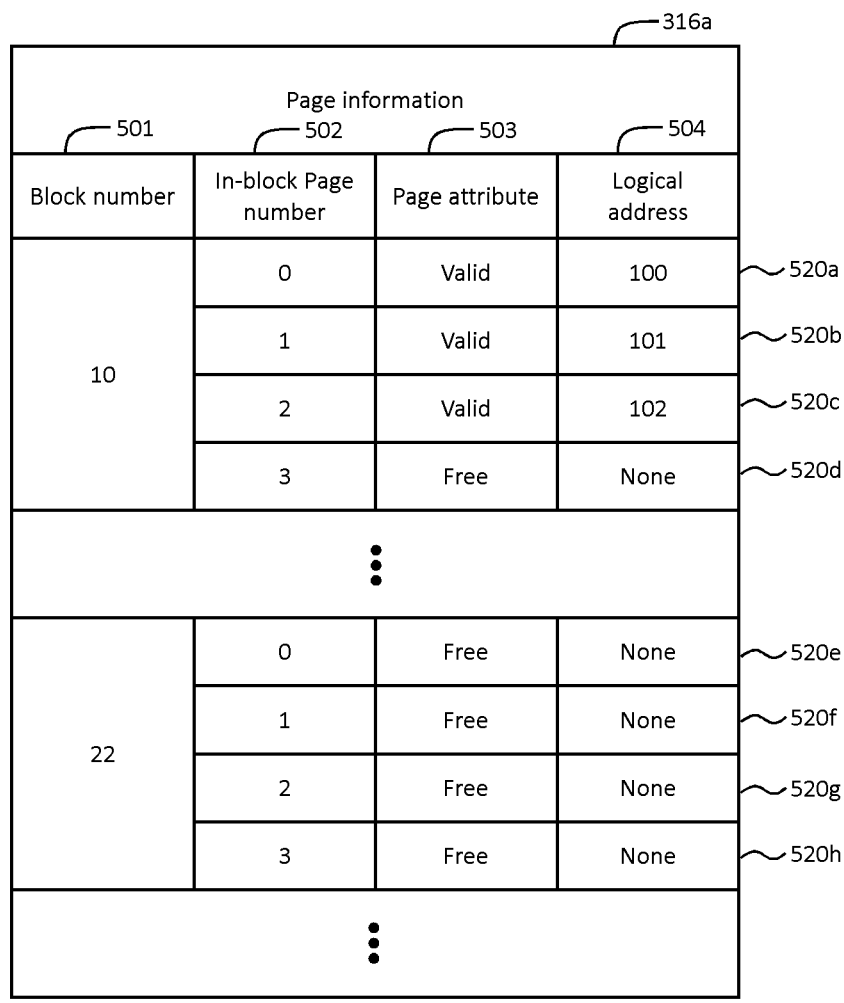
FIG. 11 shows an example of the page information at a certain time point.

FIG. 11 shows an example of page information 316a at a certain time point. The page information 316a comprises various information related to each page. For example, the page information 316a comprises as items a block number 501, an in-block page number 502, a page attribute 503, and a logical address 504.

The block number 501 is a number for identifying a block. The in-block page number 502 is a number for identifying a page inside the block.

The page attribute 503 shows the attribute of the page. That is, the page attribute 503 "valid" shows that valid data is stored in the relevant page, in other words, that the relevant page is a valid page. The page attribute 503 "invalid" shows that invalid data is stored in the relevant page, in other words, that the relevant page is an invalid page. The page attribute "free" shows that there is no data whatsoever stored in the relevant page, in other words, that the relevant page is a free page to which data can be written. The logical address 504 shows the logical address that is allocated to the relevant page.

For example, the page information 316a shown in FIG. 11 shows that "valid" data is stored in pages shown by "0", "1", and "2" of the in-block page number 502 corresponding to "10" of the block number 501 (refer to rows 520a, 520b, and 520c), and that the page corresponding to "3" of the in-block page number 502 is a "free" page (refer to row 520d). Also, the page information 316a shows that all of the pages corresponding to "22" of the block number 501 are "free" pages (refer to rows 520e, 520f, 520g and 520h).

Figure 12:
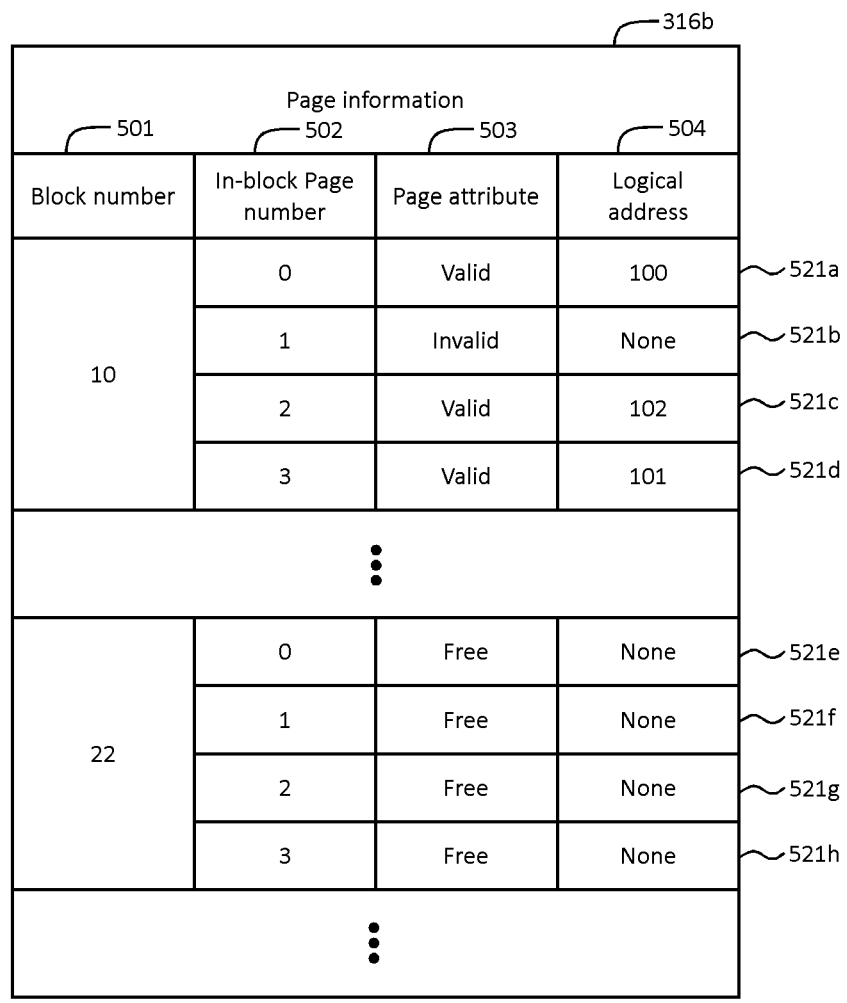
FIG. 12 shows an example of the page information at a time point after a write process has occurred.

FIG. 12 shows an example of page information 316b at a time point after the occurrence of a write process subsequent to the time point shown in FIG. 11. That is, the page information 316b shows the state of the page information 316a after the execution of Step S104 shown in FIG. 9.

The page information 316b shows that data corresponding to "101" of the logical address 504 is stored in the page, which corresponds to "1" of the in-block page number 502 corresponding to "10" of the block number 501. It is supposed here that the data corresponding to "101" of the logical address 504 has been updated by being overwritten.

Since it is not possible to directly overwrite the data in the page corresponding to "1" of the in-block page number 502, the flash storage control program 320 stores the overwrite-updated data in "101" of the logical address 504 in a free page. For example, the flash storage control program 302 stores the overwrite-updated data in "101" of the logical address 504 in the page, which corresponds to "3" of the in-block page number 502 corresponding to "10" of the block number 501, which is a "free" page of the page attribute 503, and updates this logical address 504 to "101" (refer to row 521d). At this time, the flash storage control program 302 updates the page attribute 503 for the page, which corresponds to "3" of the in-block page number 502 corresponding to "10" of the block number 501, to "free" (refer to row 521d).

When the update is complete, the data, which was stored in the page (that is, the page of row 521b) corresponding to "101" of the pre-update logical address 504, becomes redundant. Consequently, the flash storage control program 302 changes the page attribute 503, which corresponds to "1" of the in-block page number 502 corresponding to "10" of the block number 501, to "invalid".

FIG. 13 shows page information 316c at a time point after the occurrence of a valid data save process subsequent to the time point shown in FIG. 12. That is, the page information 316c shows the state of the page information 316b after the execution of Step S112 shown in FIG. 9.

In the page information 316c, the flash storage control program 302 copies the valid data corresponding to "0", "2", and "3" of the in-block page number 502, which are included in "10" of the block number 501 in the page information 316b shown in FIG. 12, to the pages, which correspond to "0", "1", and "2" of the in-block page number 502 corresponding to "22" of the block number 501 (refer to rows 522e, 522f, and 522g), and shows a state in which all the page attributes 503 of the pages, which had stored the source valid data, have been updated to "invalid" (refer to rows 522a, 522c, and 522d).

FIG. 14 shows page information 316d after a block constituting all invalid pages was erased subsequent to the time point shown in FIG. 13.

In the page information 316d, all of the page attributes 503 corresponding to "10" of the block number 501 are "free". That is, the page information 316d shows the state of the page information 316c shown in FIG. 13 after the execution of Step S110 shown in FIG. 9.

When page information 316a and 316d are compared here, the page attributes and the number of pages are identical even though the blocks storing the data are different. That is, according to the processing shown in FIGS. 11 through 14, the flow of the write process, which includes a data save and erase, has been completed. In the processing flow of FIGS. 11 through 14, the write request, which was issued from the higher-level apparatus, is for one page (that is, an overwrite-update of the page corresponding to "101" of the logical address 504). However, when the write process, which is issued to the flash memory chip 204, includes a valid page copy, there are four pages worth of data, i.e., (see row 521d) the page, which corresponds to "3" of the in-block page number 502 corresponding to "10" of the block number 501 shown in FIG. 12, and the pages, which correspond to "0", "1", and "2" of the in-block page number 502 corresponding "22" of the block number 501 shown in FIG. 13.

That is, in Step S108, in a case where the block corresponding to "10" of the block number 501 has been selected as the erase target, the flash storage control program 302 must internally copy the data in the valid pages that exist in this block to a different block 422. Because the internal copy executes a read and write with respect to the flash memory chips 204, the internal copy uses the resources of the flash memory chips 204 and the flash memory bus 223. This lowers the performance of the cache flash storage 116, and leads to increases in the number of writes and erases. Consequently, it is preferable that the block 422 selected in Step S108 be a block 422 having as few valid pages as possible, and when possible, no valid pages.

A data write process in the storage system will be explained next using FIGS. 15 through 18.

Figure 15:
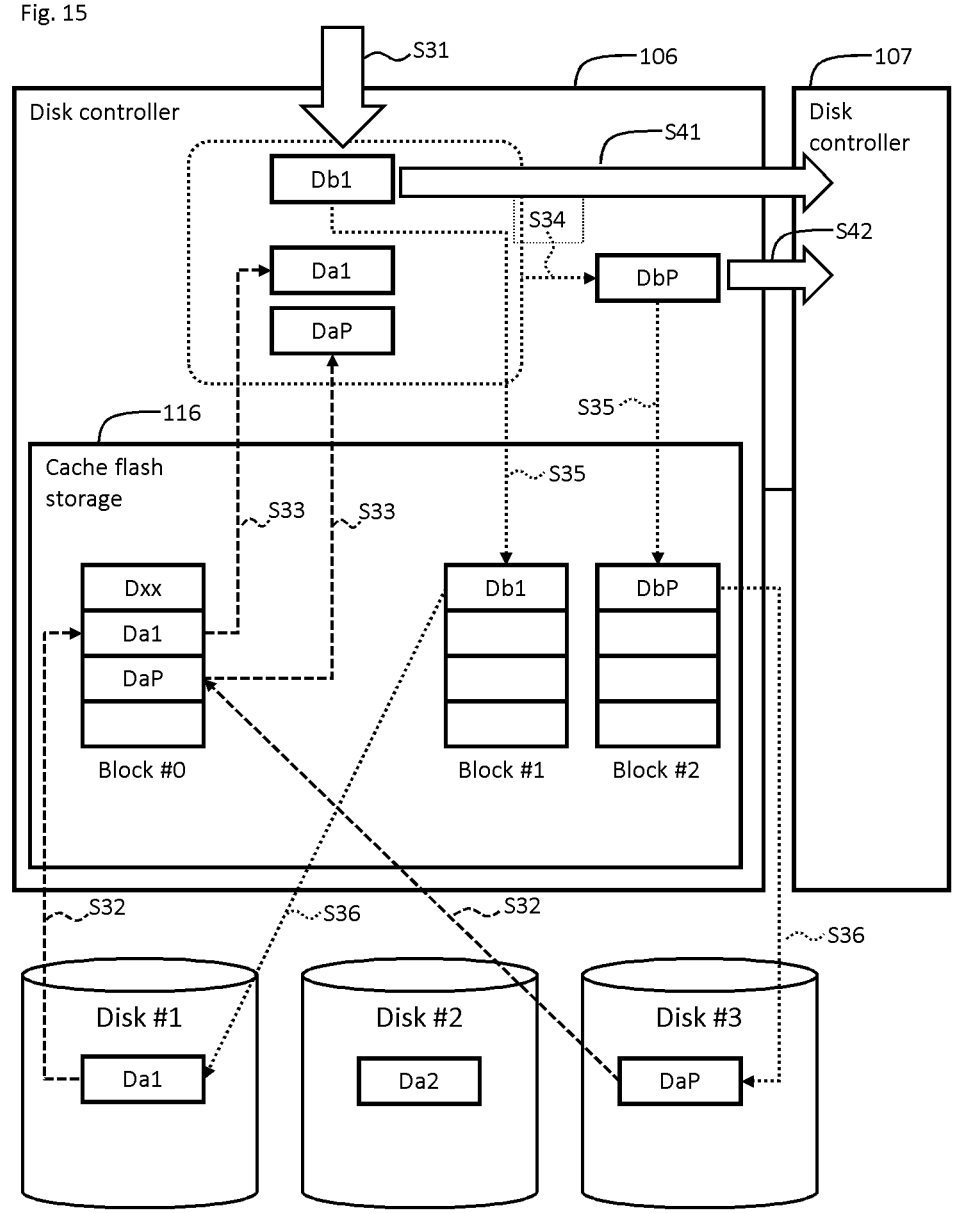
FIG. 15 shows an overview of a data overwrite update process in accordance with RAID 5.

FIG. 15 is a schematic diagram showing an overview of a data overwrite-update process in accordance with RAID 5 control.

In FIG. 15, the old data Da1 and Da2, and the old parity DaP therefor are respectively stored in disks #1, #2 and #3. It is supposed here that the disk controller 106 has received a request to overwrite-update the old data Da1 to new data Db1 (S31).

The CPU 118 of the disk controller 106 transfers the new data Db1 to the disk controller 107 as needed to achieve duplexing (S41). Then, the disk controller 106 reads the old data Da1 and the old parity DaP from disks #1 and #3, respectively, and stores this old data Da1 and old parity DaP in the cache flash storage 116 (S32). At this time, the CPU 118 notifies the cache flash storage 116 of the data attribute information for each piece of data.

The cache flash storage 116, upon receiving the old data Da1 and the old parity DaP, and the data attribute information therefor, selects a block to become the storage destination of each piece of data. When the attribute of the data Dxx stored in block #0 is either old data or old parity, the cache flash storage 116 writes the old data Da1 and the old parity DaP to block #0. Since the old data Da1 and the old parity DaP here will become redundant following the creation of new parity, the cache flash storage 116 stores this data in the same block.

Then, the CPU 118 reads the old data Da1 and the old parity DaP from the cache flash storage 116 (S33), and creates a new parity DbP from this old data Da1 and old parity DaP, and the new data Db1 (S34). The CPU 118 transfers the new parity DbP to the disk controller 107 as needed to achieve duplexing (S42).

Then, the CPU 118 stores the new data Db1 and the new parity DbP in the cache flash storage 116 (S35). At this time, the CPU 118 notifies the cache flash storage 116 of the data attribute of each piece of data.

The cache flash storage 116, upon receiving the new data Db1 and the attribute information showing that the new data Db1, selects a block to become the storage destination of the new data Db1. In a case where a block, which has the same attribute, does not exist, the cache flash storage 116 writes the new data Db1 to free block #1. Since there is a likelihood of the new data Db1 being referenced hereinafter as well, this new data Db1 is stored in a block other than the block #0. Also, the cache flash storage 116, upon receiving the new parity DbP and the attribute information showing that the new parity, selects a block for storing the new parity DbP. Since there is little likelihood of the new parity DbP being referenced after being stored in the disk, this new parity DbP is stored in a different block than that of the new data Db1. It is supposed here that the new parity DbP is stored in the free block #2.

Then, the disk controller 106 reads the new data Db1 and the new parity DbP from the cache flash storage 116, and saves this new data Db1 and new parity DbP to disk #1 and disk #3, respectively, in accordance with overwriting (S36).

Thus, in accordance with writing similar data to the same block when this data becomes redundant, it is possible to erase this block without saving (copying) the data. Next, each of the processes in FIG. 15 will be explained in detail using a flowchart.

Figure 16:
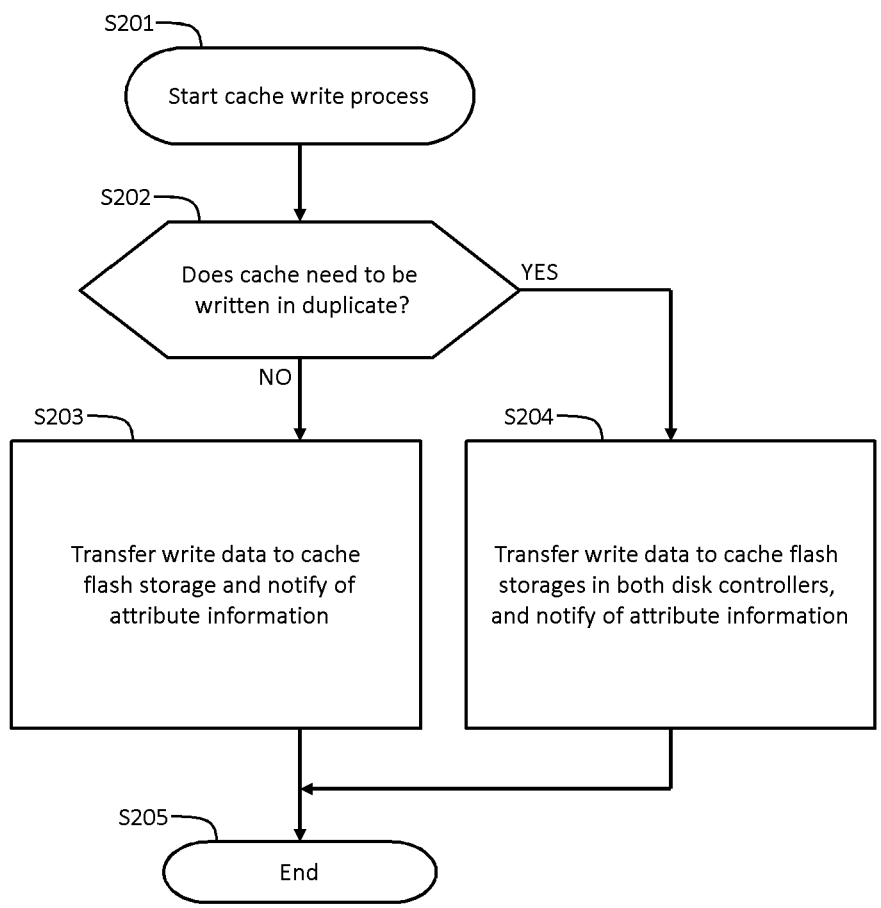
FIG. 16 shows an example of a flowchart of a process in which the disk controller writes data, which was issued from a host, to the cache flash storage.

FIG. 16 is a flowchart of a process in which the CPU 118 of the disk controller 106 writes data, which has been issued from the host computer 102, to the cache flash storage 116. FIG. 16 comprises the duplexing process for the new data Db1 of FIG. 15.

The storage control program 1902 begins a cache write process (S201) and determines whether or not cache duplexing is required (S202). That is, the storage system 101 determines whether or not there is a setup for storing the cache data in duplicate. The Yes/No determination for cache data duplexing does not have to be configured beforehand. For example, it may be determined that duplexing is not necessary in a case where a failure has occurred in one of the disk controllers, and it may be determined that duplexing is necessary in a case where both disk controllers are operating normally.

In a case where it has been determined that cache duplexing is not necessary (S202: NO), the storage control program 1902 stores the write data, which was issued from the host computer 102, in the cache flash storage 116, and notifies the cache flash storage 116 of the "master", "dirty", and "new data" attribute information (S203). In a case where RAID 5 control is being performed, the storage control program 1902 may store the data in the cache flash storage 116 after generating a new parity. Then, the storage control program 1902 ends the relevant processing (S205). The data may be stored in the cache memory 115, but in this example, the data is stored in the cache flash storage 116.

In Step S202, in a case where it has been determined that cache duplexing is necessary (S202: YES), the storage control program 1902 of the disk controller 106 transfers the write data, which was issued from the host computer 102, to the disk controller 107. In addition, the storage control program 1902 of the disk controller 106 stores the data in the cache flash storage 116 and notifies the cache flash storage 116 of the "master", "dirty", and "new data" attribute information. The storage control program 1902 of the disk controller 107, which received the data, stores the data in the cache flash storage of the disk controller 107, and, in addition, and notifies the cache flash storage of the "mirror", "dirty", and "new data" attribute information. Then, the storage control program 1902 of the disk controller 106 ends the relevant processing (S205).

Figure 17:
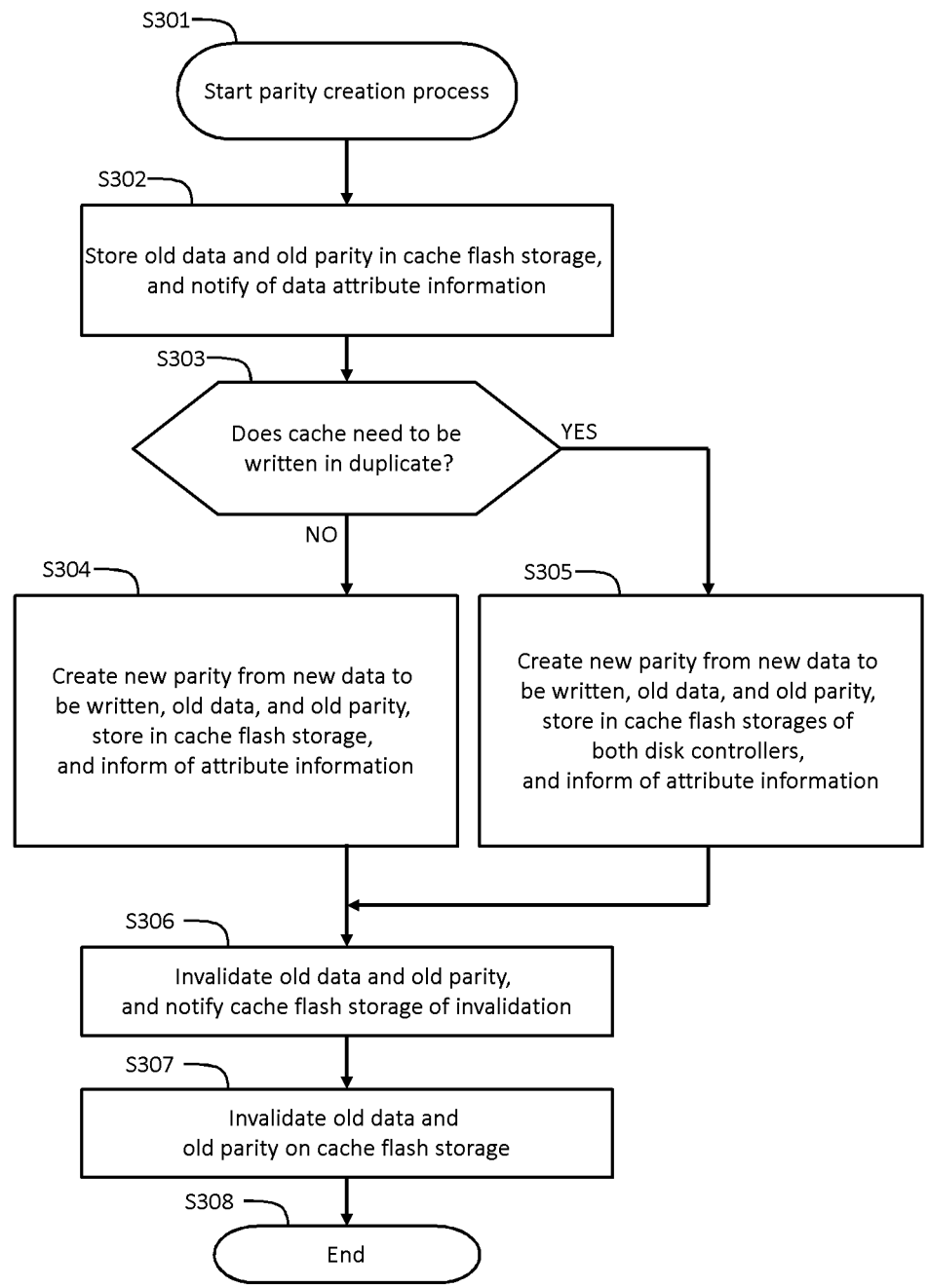
FIG. 17 shows an example of a flowchart of a parity creation process.

FIG. 17 shows an example of a flowchart of a process for creating parity data. The parity creation process shown in FIG. 17 is an example of processing in a case where the parity data is created based on RAID 5. However, the parity creation process shown in FIG. 17 may be processing in a case where the parity data is created based on another algorithm.

The storage control program 1902 of the disk controller 106 begins the parity creation process (S301), reads the old data and the old parity from the disk, and stores this old data and old parity in the cache flash storage 116 (S302). The storage control program 1902 stores the old data in the cache flash storage 116, and, in addition, notifies the cache flash storage 116 of the "master", "clean", and "old data" attribute information. Also, the storage control program 1902 stores the old data in the cache flash storage 116, and, in addition, notifies the cache flash storage 116 of the "master", "clean", and "old parity" attribute information.

The storage control program 1902 determines whether or not the parity created thereafter requires duplexing as a cache (S303). That is, the storage system 101 determines whether or not there is a setup for storing the cache data in duplicate.

In a case where it has been determined that cache duplexing is not necessary (S303: NO), the storage control program 1902 creates a new parity from the write new data, which was issued from the host computer 102, the old data, and the old parity. Then, the storage control program 1902 stores the new parity in the cache flash storage 116, and, in addition, notifies the cache flash storage 116 of the "master", "dirty", and "new parity" attribute information (S304). Then, the storage control program 1902 advances to Step S306.

In Step S303, in a case where the determination is that cache duplexing is necessary (S303: YES), the storage control program 1902 of the disk controller 106 creates the new parity from the write new data, which was issued from the host computer 102, the old data and the old parity. Then, the storage control program 1902 of the disk controller 106 transfers the new parity to the mirror-side disk controller 107. In addition, the storage control program 1902 of the disk controller 106 stores the new parity in the cache flash storage 116 of the disk controller 106, and notifies the cache flash storage 116 of the "master", "dirty", and "new parity" attribute information. The storage control program 1902 of the disk controller 107 stores the new parity in the cache flash storage of the disk controller 107, and, in addition, notifies the cache flash storage of the "mirror", "dirty", and "new parity" attribute information (S305). Then, the storage control program 1902 of the disk controller 106 advances to Step S306.

Then, the storage control program 1902 of the disk controller 106 invalidates the old data and the old parity being stored in the cache flash storage, and notifies the cache flash storage 116 of the invalidation (S306). The cache flash storage 116, which receives the notification, updates the page attribute information 503 for the old data and the old parity to invalid (S307), and ends the relevant processing (S308). This is because the old data and the old parity become redundant after the new parity has been stored in the cache flash storage 116.

Figure 18:
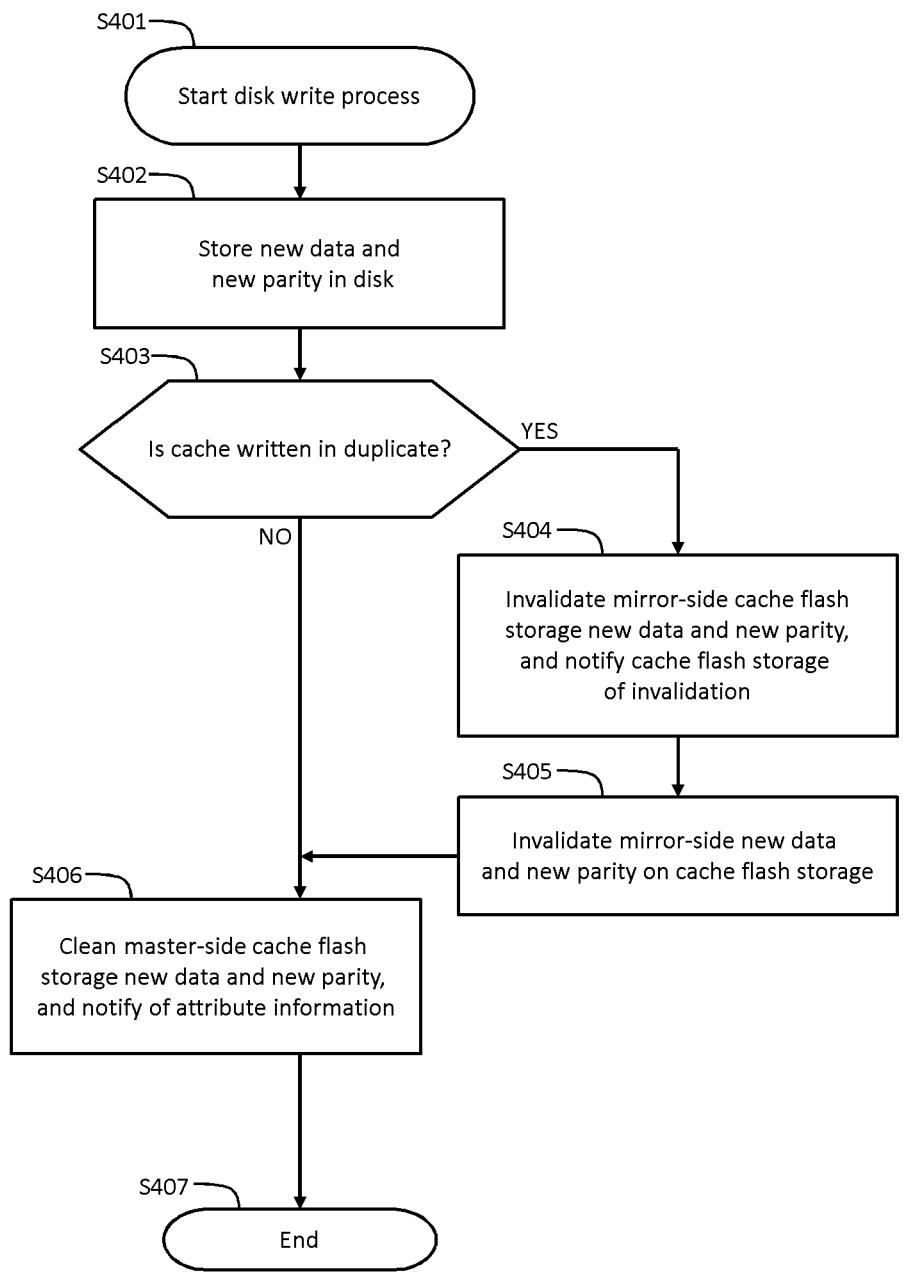
FIG. 18 shows an example of a flowchart of a process for writing new data and a new parity stored in the cache flash storage to a disk.

FIG. 18 is a flowchart of a process for writing new data and a new parity being stored in the cache flash storage 116 to the disk.

When the disk write process begins (S401), the storage control program 1902 reads the new data and the new parity stored in the cache flash storage 116 one time, and stores this new data and new parity in the disk 151 (S402).

Then, the storage control program 1902 determines whether or not cache duplexing was performed in Step S202 and/or Step S303 (S403).

In a case where cache duplexing has been performed (S403: YES), the storage control program 1902 invalidates the new data and the new parity in the cache flash storage (not shown in the drawing) provided in the mirror-side disk controller 107, and notifies the cache flash storage 116 of the invalidation (S404). The cache flash storage 116, which receives the invalidation notification, updates the page attribute information 503 for the mirror-side new data and new parity to invalid (S405), and advances to Step S406. Generally speaking, dirty data is duplexed so as not to be lost as a result of a failure, but in a case where the dirty data has been cleaned (that is, when it becomes clean data), the mirror-side data becomes redundant. Thus, the CPU 118 issues a command to the cache flash storage to invalidate the data of the one side inside the duplexed cache data. That is, the master-side CPU 118 instructs the mirror-side CPU 118 to invalidate the data stored in the cache flash storage.

In Step S403, either in a case where duplexing has not been performed (S403: NO), or after the processing of Step S405 has ended, the storage control program 1902 cleans the new data and the new parity, which is stored in the cache flash storage 116 provided in the master-side disk controller 106, notifies the cache flash storage 116 of the updated attribute information (S406), and ends the relevant processing (S407). The operation of the cache flash storage 116, which receives the attribute information change, will be explained further below.

As described hereinabove, the data stored in the cache flash storage 116 is invalidated at various times. For example, in a case where duplexing is valid, the data is written to the mirror-side cache flash storage at the time of Step S204, and invalidated at the time of Step S404. Similarly, data is written to the master-side cache flash storage 116 at the time of Step S204, and cleaned at the time of Step S405. However, the data written to the master-side cache flash storage 116 continues to exist in the cache thereafter without being invalidated. This is because there is a likelihood of the new data being accessed by the host computer.

In the post-cleaning state, the reference frequency and the update frequency will differ for the new data and the new parity, and as such, the timing at which this new data and new parity are invalidated can also differ. The old data and the old parity are written in Step S302 and invalidated in Step S306.

Thus, the storage period for the data stored in the cache flash storage 116 will differ in accordance with the data attribute thereof (type, state). For this reason, the cache flash storage 116 can reduce the amount of data copied in the reclamation process by selecting a block for storing the data in accordance with the data attribute. This makes in possible to curb a drop in performance due to an internal data copy and the shortening of the flash memory life resulting from an increase in the amount of write data.

FIG. 19 shows page information 316e at a certain time point. In the page information 316e shown in FIG. 19, it is supposed that the new data shown in Step S305 is stored in the pages corresponding to "100", "110", "300", and "310" of the logical address 504.

Similarly, the old data is stored in the pages corresponding to "200", "201", "210", and "211" of the logical address 504. It is supposed that all of the new data and the old data is stored in the one block corresponding to "10" of the block number 501.

FIG. 20 shows page information 316f at a time point, which is subsequent to the time point of FIG. 19, and at which Step S306 of the parity creation process has been completed.

When the old data is invalidated in Step S306, the pages corresponding to "1", "2", "5", and "6" of the in-block page number 502, which are respectively allocated to "200", "201", "210", and "211" of the logical address 504, are invalidated. Here, in a case where the block corresponding to "10" of the block number 501 in the page information 316f was selected as the free page creation target in Step S111, the data stored in the pages corresponding to "0", "3", "4", and "7" of the in-block page number 502, for which the page attribute 503 is "valid", must be copied (saved) to a different block. That is, when erasing a block, in a case where there exists a page having "valid" in the page attribute 503, processing for copying (saving) the data in these pages occurs.

FIG. 21 is a drawing for comparison with FIG. 19, and shows page information 316g at a certain time point. This page information 316g stores the same data as the page information 316e shown in FIG. 19. FIG. 21 differs from FIG. 19 in that a block attribute 505 is provided. The block attribute 505 may be configured when data is written to a free block and the attribute of this data is configured, or may be configured beforehand.

It is supposed that "100", "110", "300", and "310" of the logical address 504 are associated with the one block corresponding to "10" of the block number 501, and that new data is being stored in the pages shown by these logical addresses 504. That is, it is supposed that the attributes of the data stored in this block are "master", "new data", and "dirty". Then, it is supposed that "200", "201", "210", and "211" of the logical address 504 are associated with the one block corresponding to "22" of the block number 501, and that old data is being stored in the pages shown by these logical addresses 504. That is, it is supposed that the attributes of the data stored in this block are "master", "old data", and "clean". The old parity may be included in the block corresponding to block number "22". Thus, it is supposed that new data and old data are stored in different blocks.

FIG. 22 is a drawing for comparison with FIG. 20, and shows page information 316h at a time point, which is subsequent to the time point of FIG. 21, and at which Step 306 of the parity creation process has been completed.

FIG. 22 stores the same data as the page information 316f shown in FIG. 20. However, since the new data and the old data were stored in different blocks at the time point of the page information 316g shown in FIG. 21, all of the pages in the block corresponding to "10" of the block number 501 are "valid", and all of the pages in the block corresponding to "22" of the block number 501 are "invalid".

Thus, when it is supposed that the block corresponding to "22" of the block number 501 was selected as the block for creating a free page in Step S111, the selected block can be erased and the free page can be created without saving (copying) the data. This makes it possible to curb the number of erases for the block. Also, since the use of CPU resources accompanying a data copy can be curbed, the write/read processing performance improves. It is also possible to curb the use of resources such as the flash memory bus 223, which is coupled to the flash memory chips 204.

In the explanations based on FIGS. 19 through 22, the new data and the old data are stored in separate blocks, but which data is stored in what block may be determined based on a different condition. For example, pieces of data for which the storage periods differ greatly may be stored in different blocks. That is, pieces of data having relatively proximate storage periods may be collected together in the same block as much as possible. This makes it possible to reduce the amount of data in an internal copy for saving data.

FIG. 23 shows page information 316i in a state in which time has advanced since the state of FIG. 21. FIG. 23 stores the same data as that of FIGS. 21 and 22, but further comprises a page attribute details 506. The page attribute details 506 stores information regarding a case in which an attribute has been updated in page units from information defined in the block attribute 505 in accordance with some sort of process. For example, in Step S406, the new data and the new parity are cleaned, and the cache flash storage 116 is notified of the attribute information for this data. Since a time-based change occurs in the page-unit attribute information when this notification is received, the block attribute 505 cannot be expressed alone. Consequently, information related to this change is stored in the page attribute details 506, and the attribute information is updated. FIG. 23 shows an example in which the page, which corresponds to "0" of the in-block page number 502 corresponding to "10" of the block number 501, has been cleaned.

Information as to whether or not the page has been cleaned is important for the cache flash storage 116. The dirty data is data, which is unable to be discarded by the cache flash storage 116. However, because the clean data is data that is guaranteed to be stored in the disk 151, which is the final storage medium, the discarding of the clean data does not constitute a major failure such as lost data.

Figure 24:
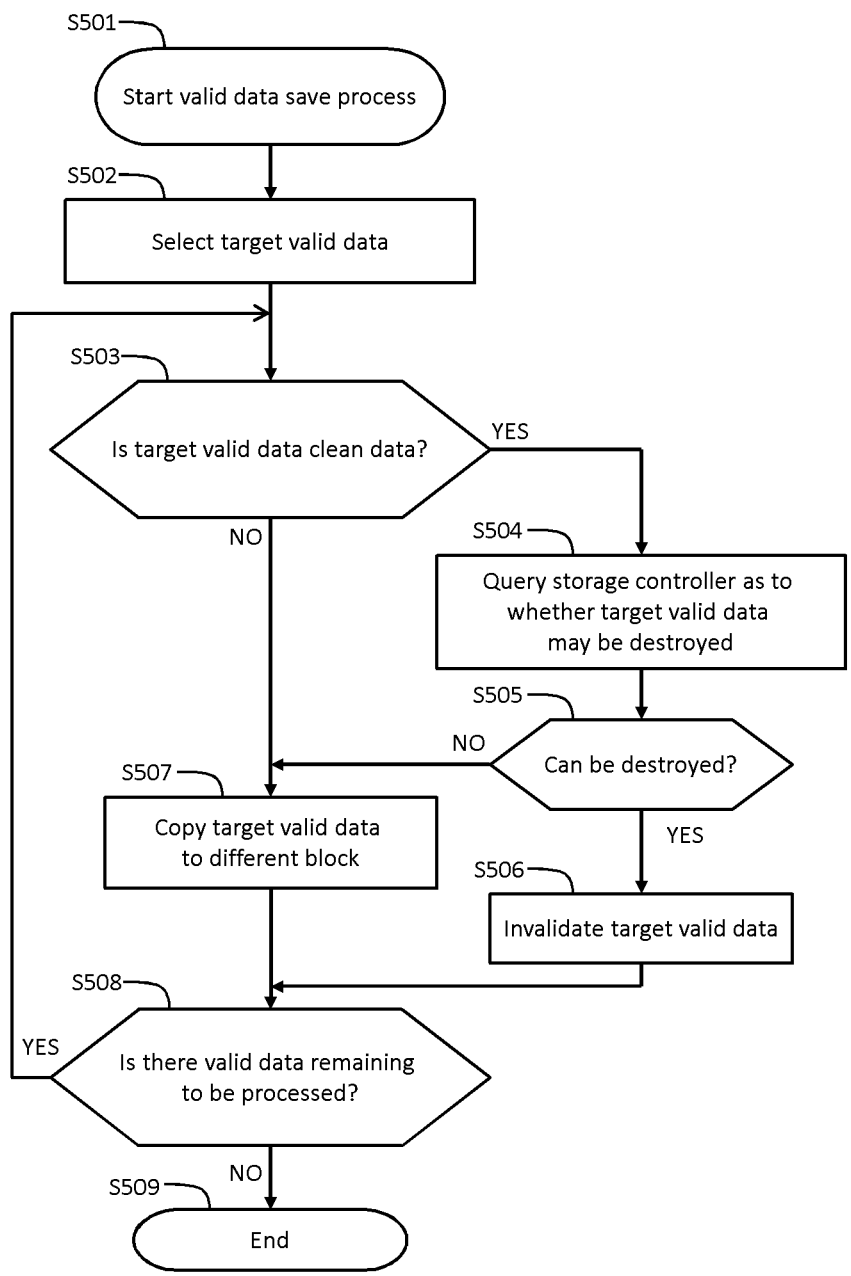
FIG. 24 shows an example of a flowchart of a data process, which uses the attribute information of each page.

FIG. 24 shows an example of a flowchart of data processing, which uses the attribute information of each page. This process constitutes the contents of the valid data save process shown in Step S109. In a normal valid data save process, copying a page, which has valid in the page attribute information 503, to a different block maintains the undiscardable data.

The cache flash storage 116, upon commencing processing (S501), first of all, selects the valid data, which will become the target (hereinafter, referred to as "target valid data") (S502). Next, the cache flash storage 116, based on the information in the page attribute details 506, determines whether or not the target valid data selected in Step S502 is clean data (S503).

In a case where the target valid data is clean data (S503: YES), the cache flash storage 116 queries the disk controller 106 as to whether or not this data may be discarded (S504). The disk controller 106 determines the advisability of discarding this data by taking into account the merits of the target data continuing to exist in the cache flash storage 116, and notifies the cache flash storage 116 of the result (S505).

In a case where the cache flash storage 116 has received a notification that discarding is possible (S505: YES), the cache flash storage 116 invalidates the target valid data (S506). Since the page attribute 503 of the invalidated target valid data becomes invalid, thereafter, the target valid data is no longer valid data, and is removed from the targets for a save process.

The cache flash storage 116, either in a case where a notification of undiscardable was received in Step S505 (S505: NO), or a case where the target valid data was not clean data in Step S503 (S503: NO), copies the target valid data to a different block (S507).

When the processing of either Step S506 or Step S507 ends, the cache flash storage 116 determines whether or not there remains valid data for which processing should continue further (S508), and in a case where such valid data remains (S508: YES), returns to Step S503. In a case where the processing for all the valid data has been completed (S508: NO), the cache flash storage 116 ends the relevant processing (S509).

The processing of FIG. 24 has as an object, by means of the cache flash storage 116, of reducing the frequency with which valid data copy (save) processing is executed. The reason for this will be described below.

The valid data copy process uses the internal resources of the cache flash storage 116, and as such, should be avoided as much as possible. However, because the valid data copy process is an internal process of the cache flash storage 116, it is not recognizable from the disk controller 106. Therefore, since the disk controller 106 is unable to recognize that inefficient copies are occurring with high frequency inside the cache flash storage 116, it is impossible to avoid this copy processing.

Also, the data held by the disk controller 106 as clean data is not necessarily much-needed data (for example, data having an extremely high read frequency). Therefore, discarding such clean data to make the internal processing of the cache flash storage 116 more efficient is likely to be effective.

Consequently, in the processing of FIG. 24, the cache flash storage 116 queries the disk controller 106 as to the advisability of discarding the valid data. This improves the efficiency of the internal processing of the cache flash storage 116.

In Steps S504 and S505 of FIG. 24, the cache flash storage 116 queries the disk controller 106 as to whether or not it is possible to discard the target valid data, but this query is not always necessary. In accordance with this, the processing of Step S504 and the processing of a NO determination in Step S505 of FIG. 24 are eliminated, and when the determination in Step S503 is YES, the cache flash storage 116 advances as-is to Step S506 and invalidates the target valid data. However, in accordance with this, there is a likelihood of a difference occurring between the cache status information 1922 of the disk controller 106 and the cache status information 314 of the cache flash storage 116. Therefore, in a case where the disk controller 106 attempts to perform a read process for data recognized as existing in the cache flash storage 116, there is a likelihood of an error occurring in that the relevant data does not exist. The disk controller 106 can deal with this by re-reading the data from the disk 151.

Figure 25:
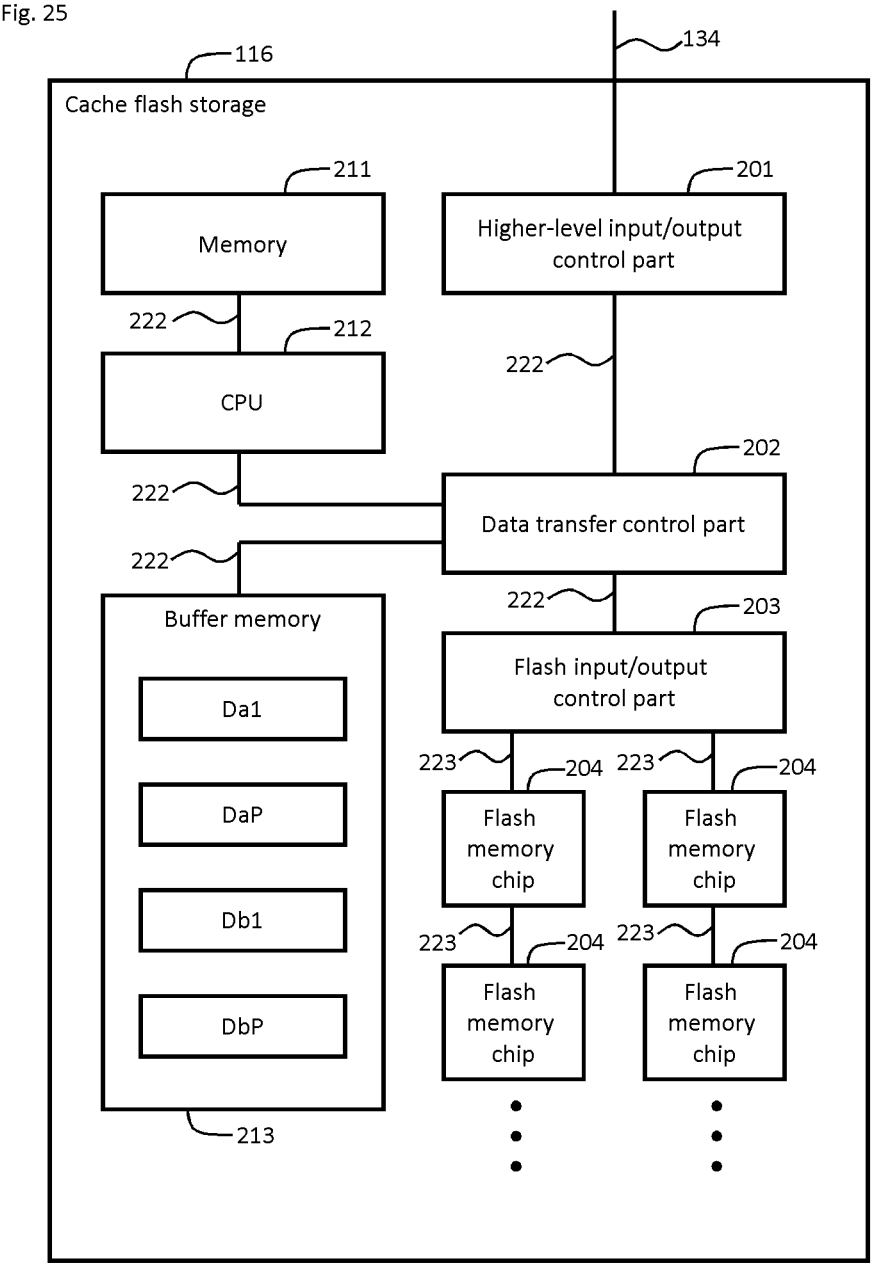
FIG. 25 shows another example in which the cache flash storage stores data.

FIG. 25 is another example of a case where the cache flash storage 116 stores data. That is, FIG. 25 shows a state in which the old data Da1, the old parity DaP, the new data Db1, and the new parity DbP are stored in the buffer memory 213 in a case where a RAID 5-based data update as shown in FIG. 15 has occurred in the cache flash storage 116.

For example, the old data Da1 and the old parity DaP become redundant after the creation of the new parity DbP. That is, the storage periods for the old data Da1 and the old parity DaP are relatively short. Therefore, the flash storage control program 302, according to circumstances, may hold the old data Da1 and the old parity DaP in the buffer memory 213 without storing this old data Da1 and old parity DaP in the flash memory. In a state where data exists only in the buffer, which is a volatile memory, there is a likelihood of the data disappearing in the case of a power failure. Thus, data (old data and old parity) having a data attribute of "clean" may be processed in the buffer without being stored in the flash memory, and data (new data and new parity) having a data attribute of "dirty" may be stored in the flash memory. Or, even in a case where the new parity disappears, new parity can be created from the new data, old data, and old parity, and as such, the new parity may be held in the buffer without being stored in the flash memory until destaging.

This makes it possible to reduce the number of writes and the number of erases with respect to the flash memory. It is also possible to curb the use of resources, such as the flash memory bus 223 coupled to the flash memory chips 204.

Also, in a case where there is a high likelihood that the new data Db1 and the new parity DbP will be discarded immediately after being stored in the disk 151 (after destaging), the CPU 118 of the disk controller 106 may notify the cache flash storage 116 of this information. In accordance with this, the memory controller 200 may hold the new data Db1 and the new parity DbP in the buffer memory 213 without storing this new data Db1 and new parity DbP in the flash memory 204.

The preceding explanation is an example in which a cache flash storage 116 is provided in a storage system 101. However, the cache flash storage 116 may be provided in a computer, such as a server. In accordance with this, either the server OS or driver may notify the cache flash storage 116 of the data attribute information when sending data.

In the above explanation, various types of information may be explained using the expression "aaa table", but the various information may also be expressed using a data structure other than a table. To show that the various information is not dependent on the data structure, "aaa table" can be called "aaa information".

Furthermore, in the above explanation, the identification information of an element (for example, a page) is a number, but an element may be identified using another type of information (for example, letters such as the alphabet, or signs) either instead of or in addition to a number.

Also, in the above explanation, there may be cases where processing is explained having a "program" as the doer of the action, but since the stipulated processing is performed in accordance with a program being executed by a processor (for example, a CPU (Central Processing Unit)), which is included in a controller, while using a storage resource (for example, a memory) and/or a communication interface device (for example, a communication port) as needed, the processor may also be used as the doer of the processing. A process, which is explained using the program as the doer of the action, may be regarded as a process performed by the controller. Furthermore, the controller may be the processor itself, and may comprise a hardware circuit that carries out either part or all of the processing performed by the processor either instead of or in addition to the processor. A computer program may be installed in a storage control apparatuses from a program source. The program source, for example, may be either a program delivery server or a computer readable storage medium.

The embodiments of the present invention explained hereinabove are examples for illustrating the present invention, and do not purport to limit the scope of the present invention to these embodiments. A person of ordinary skill in the art will be able to put the present invention into practice using a variety of other modes without departing from the gist of the present invention.

REFERENCE SIGNS LIST

101 Storage system
106 Disk controller
116 Cache flash storage

The invention claimed is:

1. A storage system, comprising:
multiple storage devices for storing data; and
a storage controller, which comprises a processor and a cache memory in which data to be stored in the multiple storage devices is stored temporarily, wherein
the cache memory comprises a nonvolatile semiconductor memory as a storage medium, and comprises a cache controller, which is coupled to the nonvolatile semiconductor memory,
the nonvolatile semiconductor memory comprises multiple blocks, each of the multiple blocks is a data erase unit and comprises multiple pages, and each of the multiple pages is a data write and read unit,
the processor sends to the cache memory data and attribute information, which comprises information related to a storage period, which is a period of time during which the data is stored in the cache memory, and wherein
the cache controller:
receives the data and the attribute information from the processor;
selects a storage-destination block for the received data based on the received attribute information and attribute information on the data stored in the multiple blocks; and
writes the received data to a page inside the selected storage-destination block,
wherein the cache controller selects the storage-destination block such that data, for which the length of the storage period is within a prescribed value, is stored in the same block,
wherein the cache controller selects the storage-destination block such that different data, for which the length of a time period during which the data is stored in the cache memory is equal to or larger than a prescribed value, is stored in different blocks,
wherein, in a process for creating a parity, which is a redundancy code, in a case where the processor controls the multiple storage devices as a RAID and updates old data, which is pre-update data stored in any of the multiple storage devices, to new data, which is the data after updating the old data,
the processor reads the old data and old parity, which is associated with the old data, from the multiple storage devices, sends the old data and attribute information showing the old data to the cache memory, and sends the old parity and attribute information showing the old parity to the cache memory, and
the cache controller, based on the attribute information showing the old data and the attribute information showing the old parity, selects the same block as a storage-destination block for the old data and a storage-destination block for the old parity,
wherein the processor invalidates old data and old parity when cache duplexing of new parity is completed after parity renewal if the new parity has to be duplexed in the cache memory.

2. A storage system according to claim 1, wherein
the processor sends the new data and attribute information showing the new data to the cache memory, and
the cache controller, based on the attribute information showing the old data, the attribute information showing the old parity, and the attribute information showing the new data, selects a block as the storage-destination block for the new data a block, which differs from the storage-destination block for the old data and the old parity.

3. A storage system according to claim 2, wherein
the attribute information comprises information showing whether the data shown by the attribute information is clean data, which is data that is stored in the storage device, or dirty data, which is data that is not stored in the storage device, and
the cache controller, based on the attribute information showing the old data and the attribute information showing the old parity, selects different blocks as the storage-destination block for the old data and the storage-destination block for the old parity in a case where one of the old data and the old parity is the clean data and the other one of the old data and the old parity is the dirty data.

4. A storage system according to claim 3, wherein the processor, in a case where data read from the storage device is to be stored in the cache memory, updates the attribute information of the read data to information showing the clean data.

5. A storage system according to claim 4, wherein
the cache controller further comprises page attribute information showing an attribute of each page in the block,
the cache controller, in a case where attribute information received from the processor shows the clean data, updates the page attribute information corresponding to a storage-destination page in the storage-destination block of the data, shown by the received attribute information, to page attribute information, which comprises information showing the clean data, and
the cache controller inquires of the processor whether invalidating valid data is acceptable with respect to a page, which corresponds to the page attribute information comprising information showing the clean data and which stores the valid data, and in a case where a response has been received from the processor to the effect that invalidation is possible, invalidates the valid data.

6. A storage system according to claim 1, wherein the cache controller selects the storage-destination block such that different data, for which the length of a time period during which the data is stored in the cache memory is equal to or larger than a prescribed value, is stored in different blocks.

7. A storage system according to claim 1, wherein
the attribute information comprises information showing whether the data shown by the attribute information is clean data, which is data that is stored in the storage device, or dirty data, which is data that is not stored in the storage device, and
the cache controller, based on the attribute information, selects the storage-destination block such that the data, which is the clean data, and the data, which is the dirty data, are stored in different blocks.

8. A storage system according to claim 1, wherein
the attribute information comprises information showing whether the data shown by the attribute information is clean data, which is data that is stored in the storage device, or dirty data, which is data that is not stored in the storage device,
the cache controller further comprises page attribute information showing an attribute of each page in the block, and wherein
the cache controller, in a case where attribute information received from the processor shows the clean data, updates the page attribute information corresponding to a storage-destination page in the storage-destination block for the data, shown by the received attribute information, to page attribute information, which comprises information showing the clean data, and the cache controller inquires of the processor whether invalidating valid data is acceptable with respect to a page, which corresponds to the page attribute information comprising information signifying the clean data and which stores the valid data, and in a case where a response has been received from the processor to the effect that invalidation is possible, invalidates the valid data.

9. A storage system, comprising:
multiple storage devices for storing data; and
a storage controller, which comprises a processor and a cache memory in which data to be stored in the multiple storage devices is stored temporarily, wherein
the cache memory comprises a nonvolatile semiconductor memory as a storage medium, and comprises a cache controller, which is coupled to the nonvolatile semiconductor memory,
the nonvolatile semiconductor memory comprises multiple blocks, each of the multiple blocks is a data erase unit and comprises multiple pages, and each of the multiple pages is a data write and read unit,
the processor sends to the cache memory data and attribute information, which comprises information related to a storage period, which is a period of time during which the data is stored in the cache memory, and wherein
the cache controller;
receives the data and the attribute information from the processor;
selects a storage-destination block for the received data based on the received attribute information and attribute information on the data stored in the multiple blocks; and
writes the received data to a page inside the selected storage-destination block,
wherein, in a process for creating a parity, which is a redundancy code, in a case where the processor controls the multiple storage devices as a RAID, and updates old data, which is pre-update data stored in any of the multiple storage devices, to new data, which is the data after updating the old data,
the processor reads the old data and old parity, which is associated with the old data, from the multiple storage devices, sends the old data and attribute information showing the old data to the cache memory, and sends the old parity and attribute information showing the old parity to the cache memory, and
the cache controller, based on the attribute information showing the old data and the attribute information showing the old parity, selects the same block as the storage-destination block for the old data and the storage-destination block for the old parity,
wherein the processor invalidates old data and old parity when cache duplexing of new parity is completed after parity renewal if the new parity has to be duplexed in the cache memory.

10. A storage system according to claim 9, wherein
the processor sends the new data and attribute information showing the new data to the cache memory, and
the cache controller, based on the attribute information showing the old data, the attribute information showing the old parity, and the attribute information showing the new data, selects as the storage-destination block for the new data a block, which differs from the storage-destination block for the old data and the old parity.

11. A cache control method of a cache memory, which comprises a cache controller and a nonvolatile semiconductor memory as a storage medium, wherein the nonvolatile semiconductor memory comprises multiple blocks, each of the multiple blocks is a data erase unit and comprises multiple pages, and each of the multiple pages is a data write and read unit, the cache control method comprising:

receiving data and attribute information, which comprises information related to a period of time during which the data is stored in the cache memory;

selecting, based on the received attribute information and attribute information of the data stored in the multiple blocks, a storage-destination block for storing the received data;

writing the received data to a page inside the selected storage-destination block;

selecting the storage-destination block such that data, for which the length of the storage period is within a prescribed value, is stored in the same block;

selecting the storage-destination block such that different data, for which the length of a time period during which the data is stored in the cache memory is equal to or larger than a prescribed value, is stored in different blocks;

wherein, in a process for creating a parity, which is a redundancy code, controlling the multiple storage devices as a RAID and updating old data, which is pre-update data stored in any of the multiple storage devices, to new data, which is the data after updating the old data;

reading the old data and old parity, which is associated with the old data, from the multiple storage devices, sending the old data and attribute information showing the old data to the cache memory, and sending the old parity and attribute information showing the old parity to the cache memory;

based on the attribute information showing the old data and the attribute information showing the old parity, selecting the same block as a storage-destination block for the old data and a storage-destination block for the old parity; and invalidating old data and old parity when cache duplexing of new parity is completed after parity renewal if the new parity has to be duplexed in the cache memory.

* * * * *